US012202055B2

(12) United States Patent
Zhou et al.

(10) Patent No.: US 12,202,055 B2
(45) Date of Patent: Jan. 21, 2025

(54) CHUCK WITH LOCKING SLEEVE

(71) Applicants: Jacobs Chuck Manufacturing (Suzhou) Company, Ltd., Suzhou (CN); Apex Brands, Inc., Apex, NC (US)

(72) Inventors: Jichun Zhou, Suzhou (CN); Tingwei Zeng, Suzhou (CN)

(73) Assignees: APEX BRANDS, INC., Apex, NC (US); JACOBS CHUCK MANUFACTURING (SUZHOU) COMPANY, LTD., Suzhou (CN)

( * ) Notice: Subject to any disclaimer, the term of this patent is extended or adjusted under 35 U.S.C. 154(b) by 0 days.

(21) Appl. No.: 18/683,607

(22) PCT Filed: Aug. 17, 2021

(86) PCT No.: PCT/CN2021/113032
§ 371 (c)(1),
(2) Date: Feb. 14, 2024

(87) PCT Pub. No.: WO2023/019434
PCT Pub. Date: Feb. 23, 2023

(65) Prior Publication Data
US 2024/0261873 A1 Aug. 8, 2024

(51) Int. Cl.
*B23B 31/12* (2006.01)
(52) U.S. Cl.
CPC ........ *B23B 31/123* (2013.01); *B23B 31/1238* (2013.01); *B23B 2231/14* (2013.01)
(58) Field of Classification Search
CPC .............. B23B 31/123; B23B 31/1238; B23B 2231/14
See application file for complete search history.

(56) References Cited

U.S. PATENT DOCUMENTS 6,260,856 B1 *  7/2001  Temple-Wilson ........................... B23B 31/1238
                                                                   279/140
7,708,288 B2 *  5/2010  Bordeianu ............ B23B 31/123
                                                                   279/140

(Continued)

FOREIGN PATENT DOCUMENTS

CN        1318445 A        10/2001
CN        1931484 A         3/2007

(Continued)

OTHER PUBLICATIONS

International Search Report and Written Opinion of corresponding International Application No. PCT/CN2021/113032, mailed on May 24, 2022, all enclosed pages cited herein.

*Primary Examiner* — Eric A. Gates
(74) *Attorney, Agent, or Firm* — BURR & FORMAN LLP

(57) ABSTRACT

A chuck for use with a power driver having a rotatable drive spindle is provided. The chuck may include a sleeve comprising a sleeve tightening surface that may be configured to engage with a nut tightening surface to tighten a nut when the sleeve is rotated into a tightening position. With the sleeve disposed in a sleeve locked position, a click pawl may be engaged with a click stopping edge of one of the plurality of click teeth to inhibit rotation of the nut in a first rotational direction to loosen the nut. A lock pawl may also be engaged with a lock stopping edge of one of the plurality of lock teeth to inhibit rotation of the sleeve in a second rotational direction due to the inertia in the sleeve that would tend to further tighten the nut.

20 Claims, 20 Drawing Sheets

(56) References Cited

U.S. PATENT DOCUMENTS

| | | | | |
|---|---|---|---|---|
| 7,845,651 | B2* | 12/2010 | Yaksich | B23B 31/123 |
| | | | | 279/140 |
| 11,660,682 | B2* | 5/2023 | Zhou | B23B 31/123 |
| | | | | 279/62 |
| 2020/0038967 | A1* | 2/2020 | Zhou | B23B 31/123 |
| 2020/0230712 | A1* | 7/2020 | Zeng | B23B 31/1238 |

FOREIGN PATENT DOCUMENTS

| CN | 101125373 A | 2/2008 |
|---|---|---|
| CN | 101370607 A | 2/2009 |
| DE | 4438991 A1 | 5/1996 |
| DE | 10335500 A1 | 3/2005 |

* cited by examiner

CHUCK WITH LOCKING SLEEVE

TECHNICAL FIELD

Example embodiments generally relate to chucks for use with power drivers including power drills, and more particularly, relate to chucks with overtightening protection.

BACKGROUND

Power drivers with rotating drive spindles are often operably coupled to a chuck that is adjustable in size to be able to attach various working bits, such as drill bits or other tools that are rotated with the chuck by the drive spindle of the power driver. Conventional chucks typically employ moveable jaws that are operable to adjust a diameter of an opening in the chuck for receiving a working bit. In many instances these jaws are held in place while the power driver is in a working mode (e.g., drilling a hole, driving a fastener, etc.) by a nut with a threaded engagement with the jaws. In some instances, due to inertia created by rotation and vibration, the nut can move relative to the body of the chuck while performing a working operation, such as, drilling a hole, driving a fastener, or the like. In this regard, substantial inertial forces from a chuck sleeve can be applied to the nut due to sudden stopping of the spindle, which can occur frequently due to use of an electric drive motor. Such movement of the nut can lead to unexpected and undesired over-tightening of the jaws onto the working bit causing the chuck to lock up. In this locked up state, the chuck may be difficult to operate to loosen the jaws. As such, innovation in the area of preventing unexpected and undesired movement of the nut is needed to control clamping forces on the working bit even in the presence of inertial forces and vibrations affecting the nut.

SUMMARY OF SOME EXAMPLES

According to some example embodiments, an example chuck for use with a power driver having a rotatable drive spindle is provided. The chuck may comprise a plurality of jaws, where each jaw includes jaw threading. The chuck may further comprise a body. The body may be configured to rotate with the drive spindle. In this regard, the plurality of jaws may be configured to rotate with the body about a center axis of the chuck. Further, the plurality of jaws may be configured to move relative to the body in an opening or closing direction. The chuck may further comprise a nut. The nut may be operably coupled with the jaw threading of the jaws such that rotation of the nut relative to the body moves the jaws relative to the body in the opening or closing direction. The nut may also comprise a nut tightening surface. The chuck may further comprise a nut race. The nut race may be operably coupled to the nut such that the nut race rotates with the nut. Further, the nut race may comprise a lock pawl and a click pawl. The chuck may further comprise a body race. The body race may be operably coupled to the body such that the body race rotates with the body. In this regard, the body race may comprise a plurality of click teeth having click stopping edges oriented in a first rotational direction and a plurality of lock teeth having lock stopping edges oriented in a second rotational direction. Further, the first rotational direction may be opposite the second rotational direction. The chuck may further comprise a sleeve. Further, the sleeve may comprise a sleeve tightening surface that may be configured to engage with the nut tightening surface to tighten the nut when the sleeve is rotated into a tightening position. In this regard, the sleeve may be disposed in a sleeve locked position. Further, with the sleeve in the sleeve locked position, the click pawl may be engaged with the click stopping edge of one of the plurality of click teeth to inhibit rotation of the nut in the first rotational direction to loosen the nut. Additionally, with the sleeve in the sleeve locked position, the lock pawl may be engaged with a lock stopping edge of the plurality of lock teeth to inhibit rotation of the sleeve in the second rotational direction due to rotational inertia in the sleeve that may tend to further tighten the nut.

According to some example embodiments, another example chuck for use with a power driver having a rotatable drive spindle is provided. The chuck may comprise a body and a plurality of jaws. The plurality of jaws may be configured to move relative to the body in an opening or closing direction. The chuck may further comprise a nut operably coupled to the plurality of jaws such that movement of the nut relative to the body moves the jaws in the opening or closing direction. Further, the nut may comprise a tightening nut surface. The chuck may further comprise a nut race operably coupled to the nut such that the nut race is fixed to the nut. Further, the nut race may comprise a lock pawl and a click pawl. The chuck may further comprise a body race operably coupled to the body. Further, the body race may comprise a plurality of teeth. The chuck may further comprise a sleeve comprising a sleeve tightening surface that may be configured to engage with the nut tightening surface to tighten the nut when the sleeve is rotated into a tightening position. In this regard, the sleeve may be dispose in a sleeve locked position. Further, the click pawl may be engaged with a first tooth of the plurality of teeth to inhibit rotation of the nut in a first rotational direction. Further, the lock pawl may be engaged with the second tooth of the plurality of teeth to inhibit rotation of the sleeve in the second rotational direction due to rotational inertia in the sleeve.

BRIEF DESCRIPTION OF THE DRAWINGS

Figure 1:
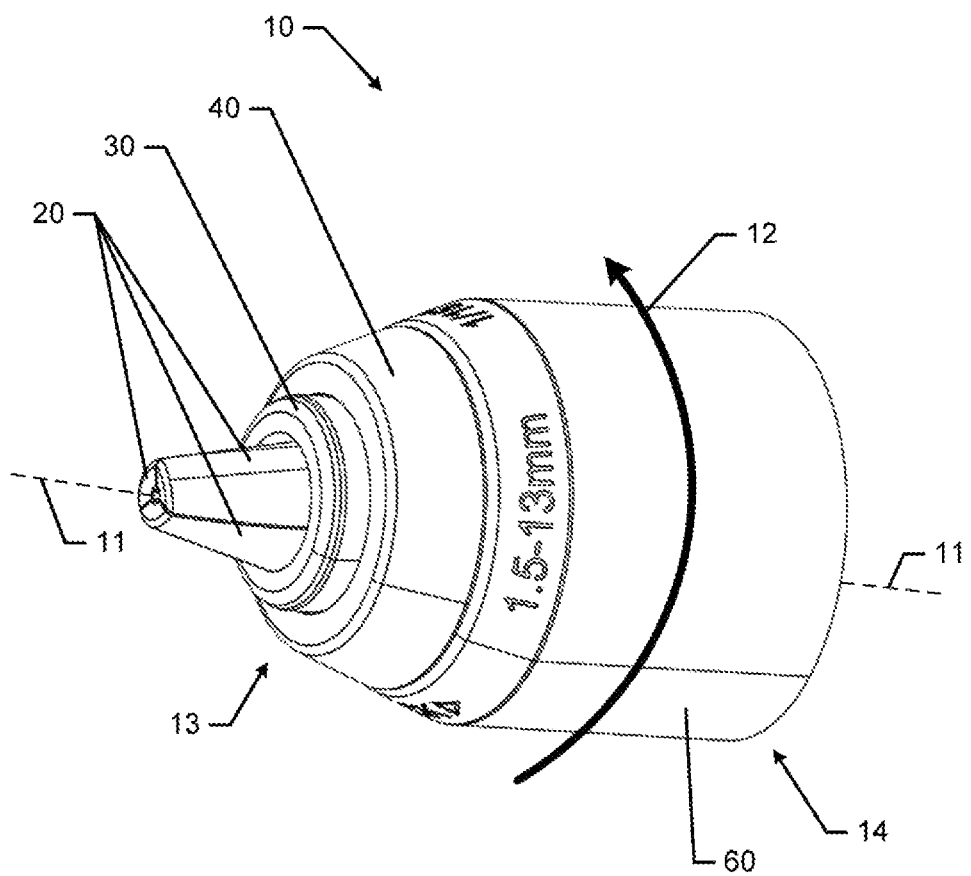
Figure 2:
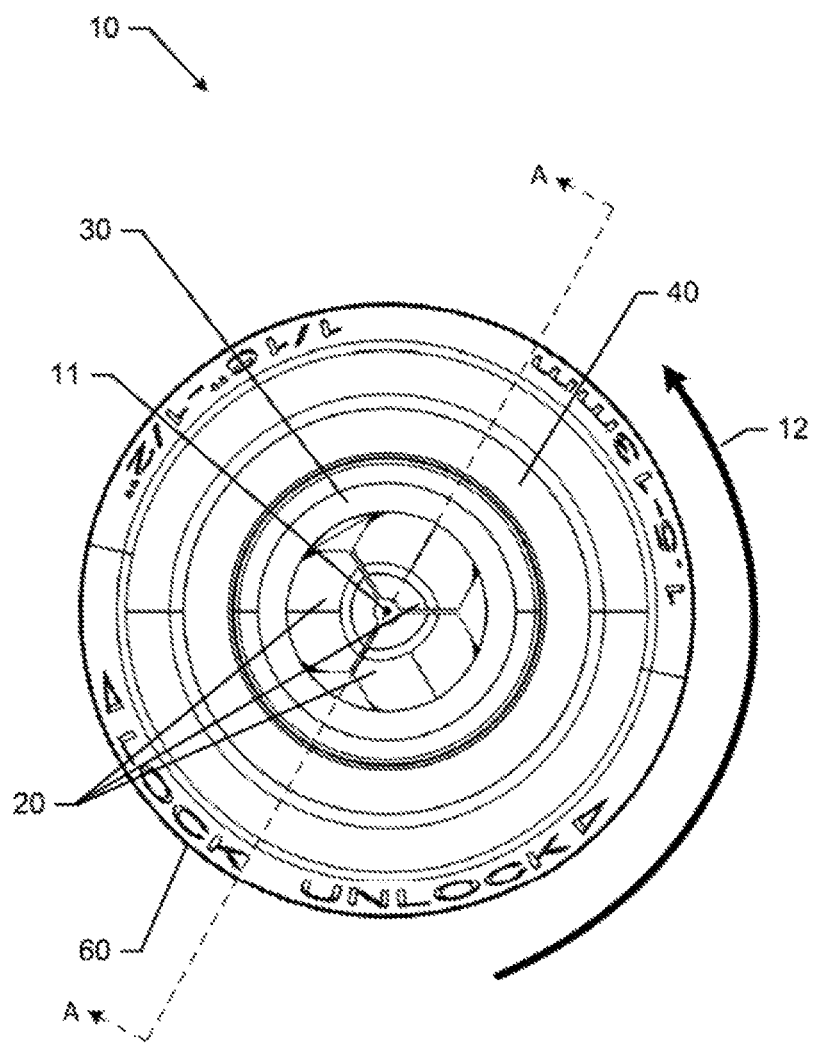
Figure 3:
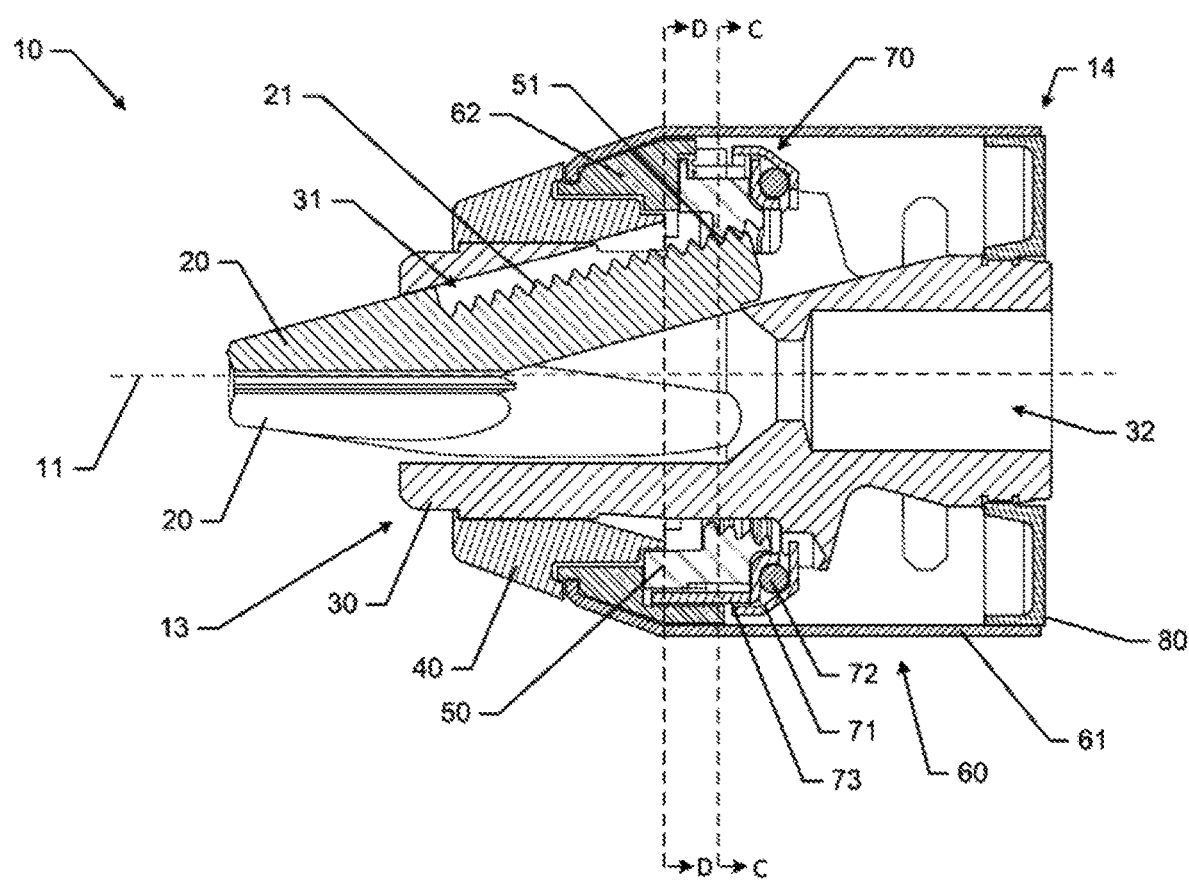
Figure 4:
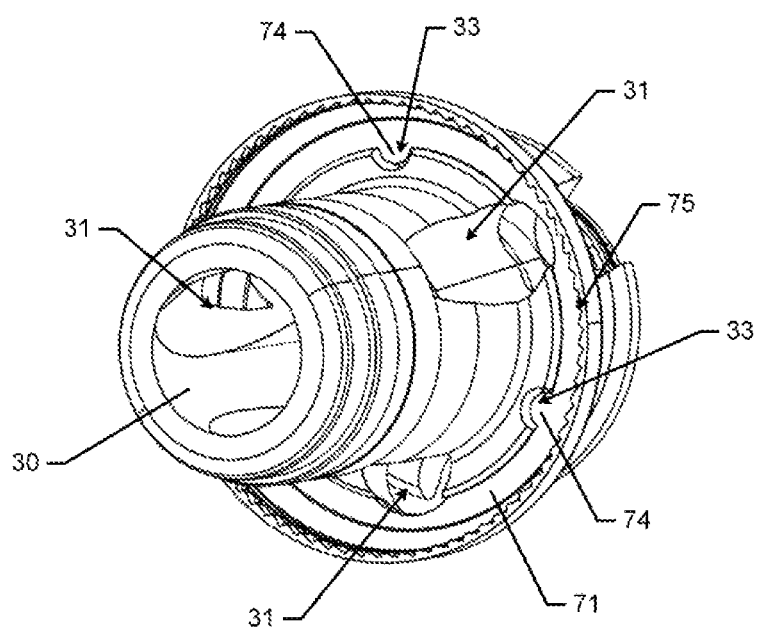
Figure 5:
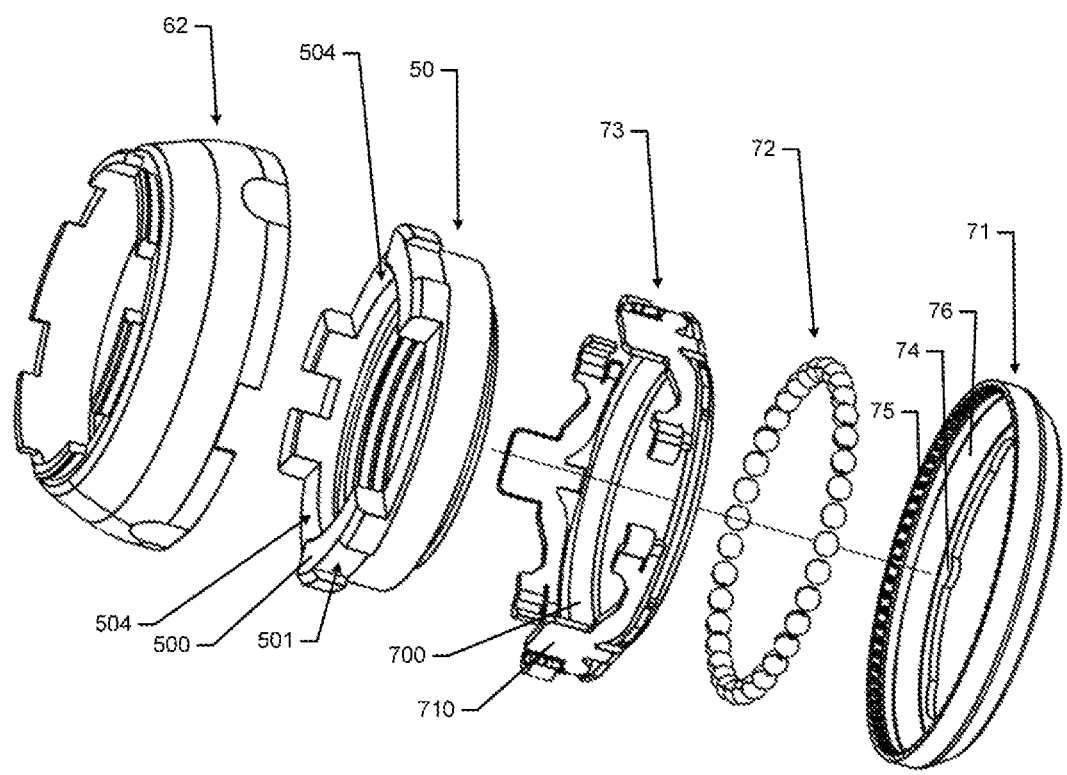
Figure 6:
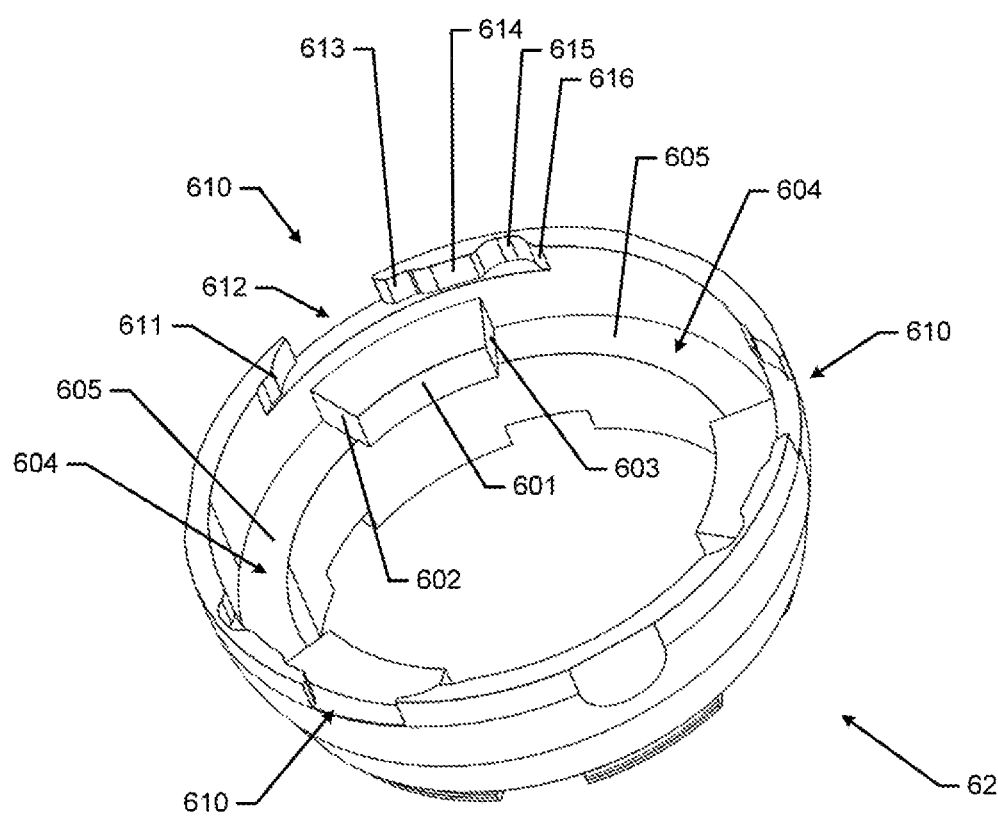
Figure 7:
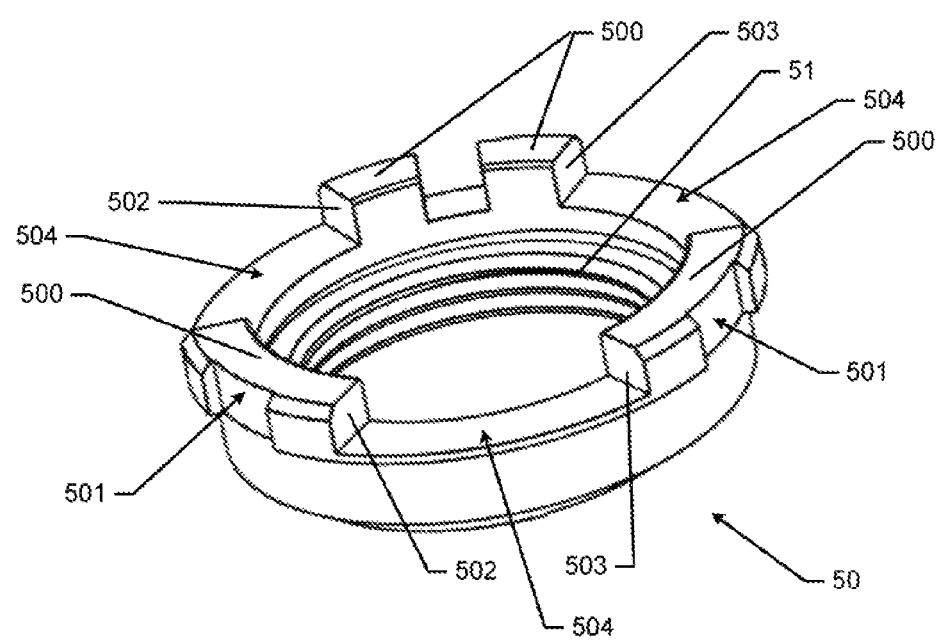
Figure 8:
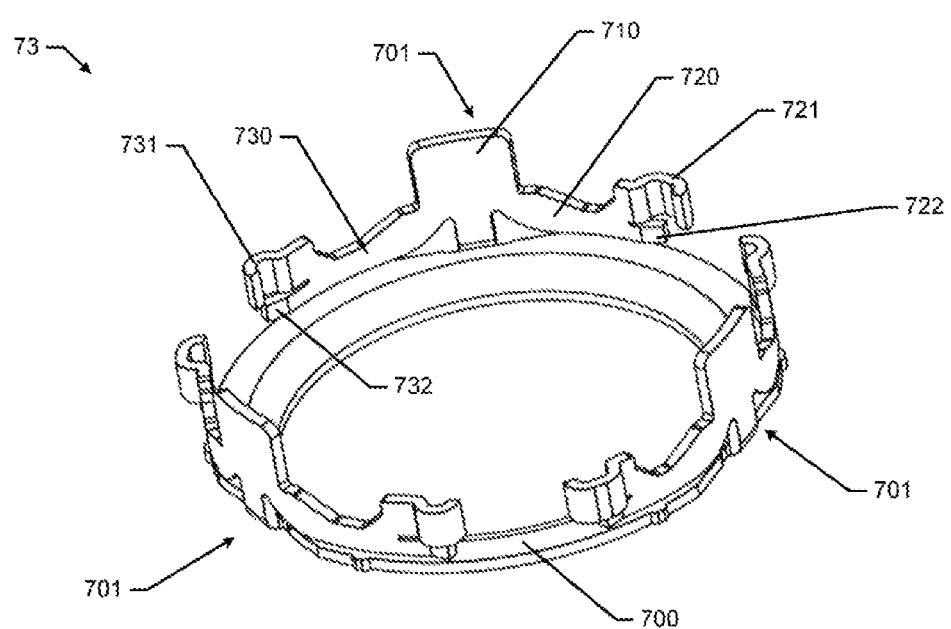
Figure 9A:
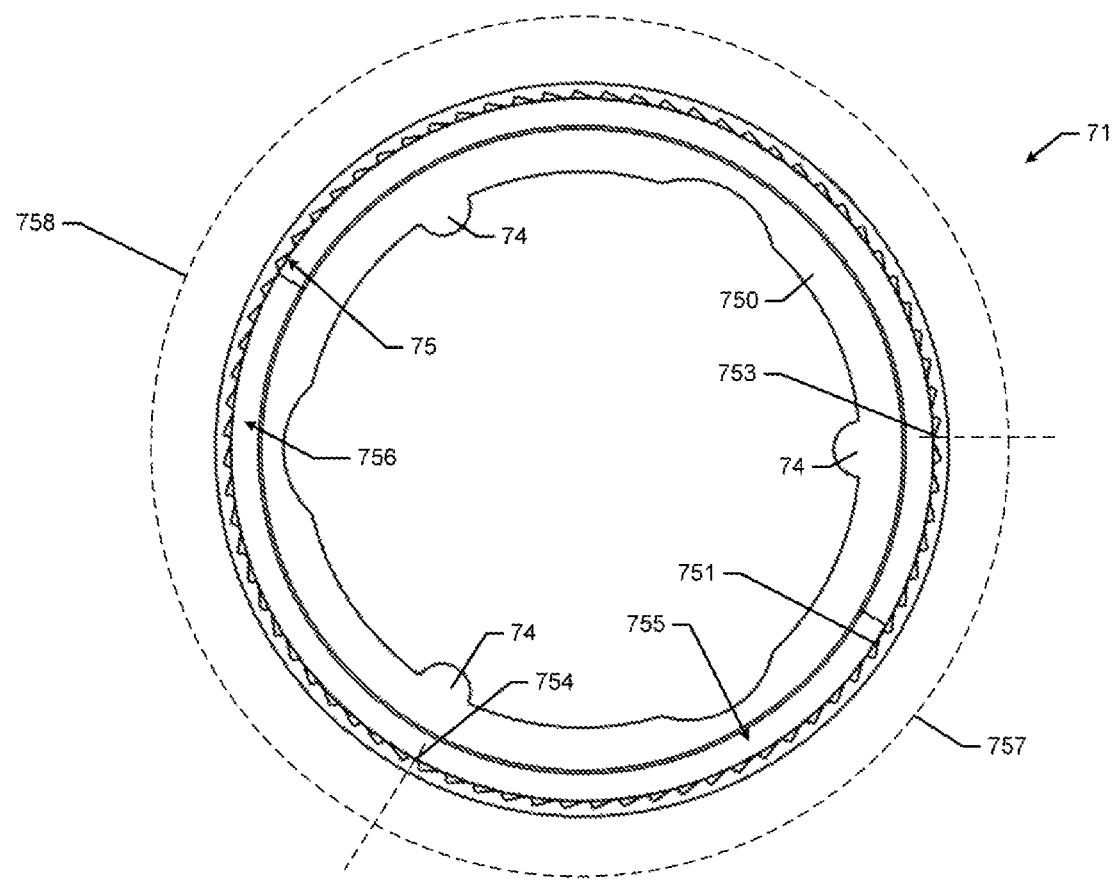
Figure 9B:
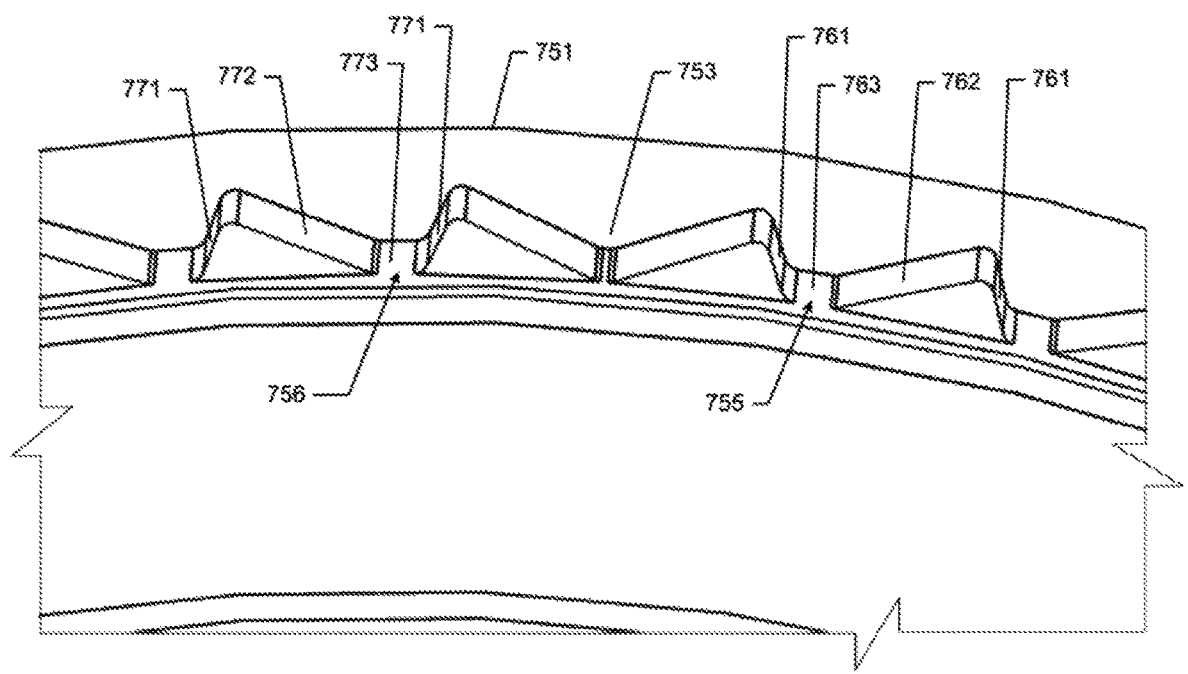
Figure 9C:
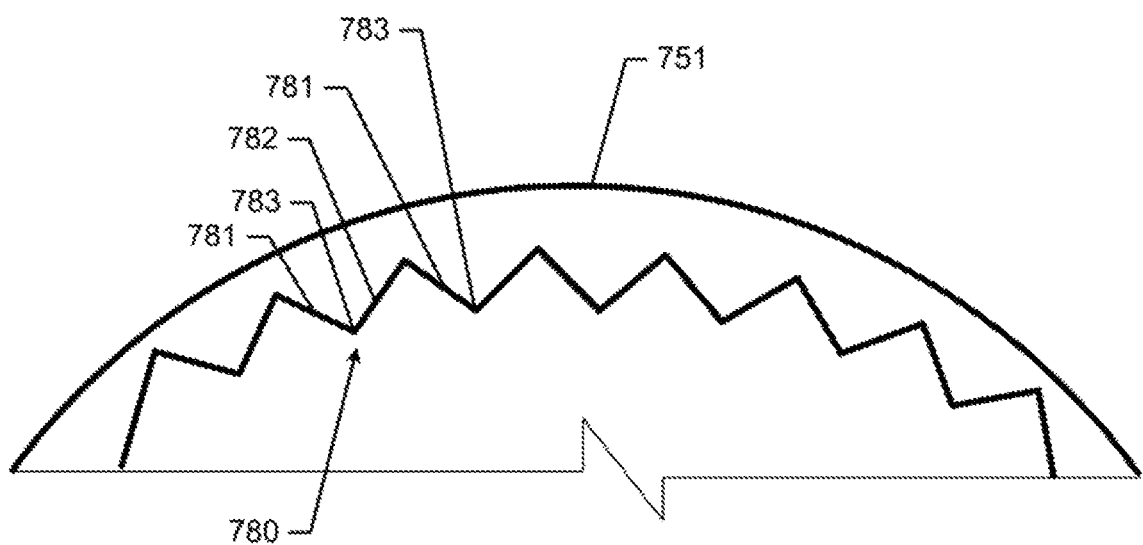
Figure 10A:
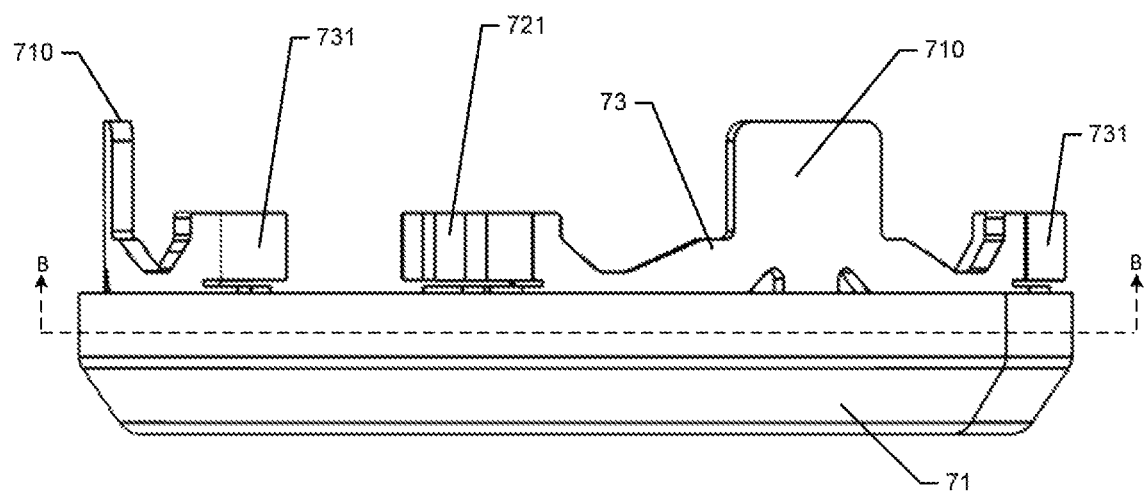
Figure 10B:
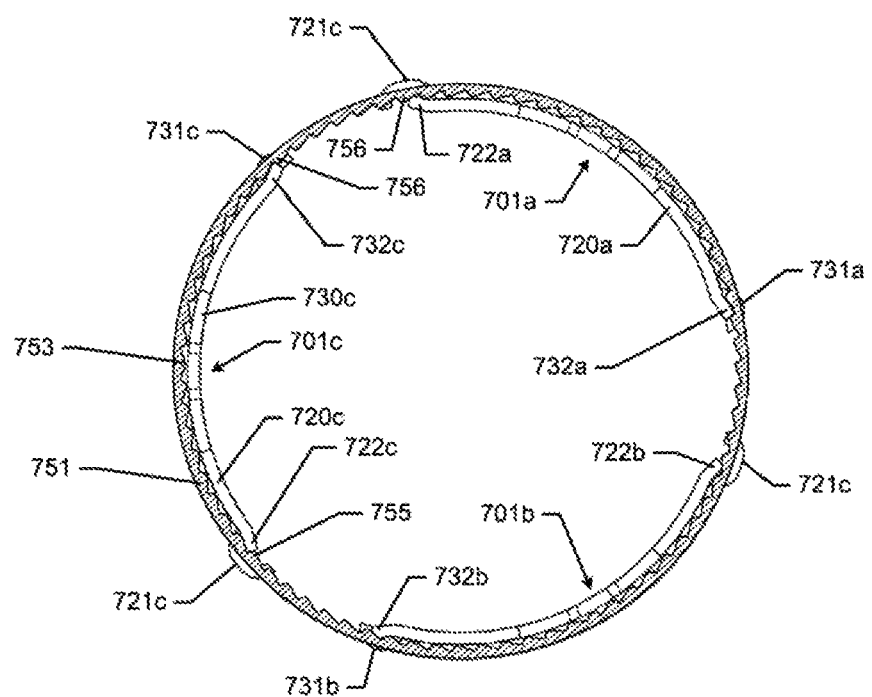
Figure 11A:
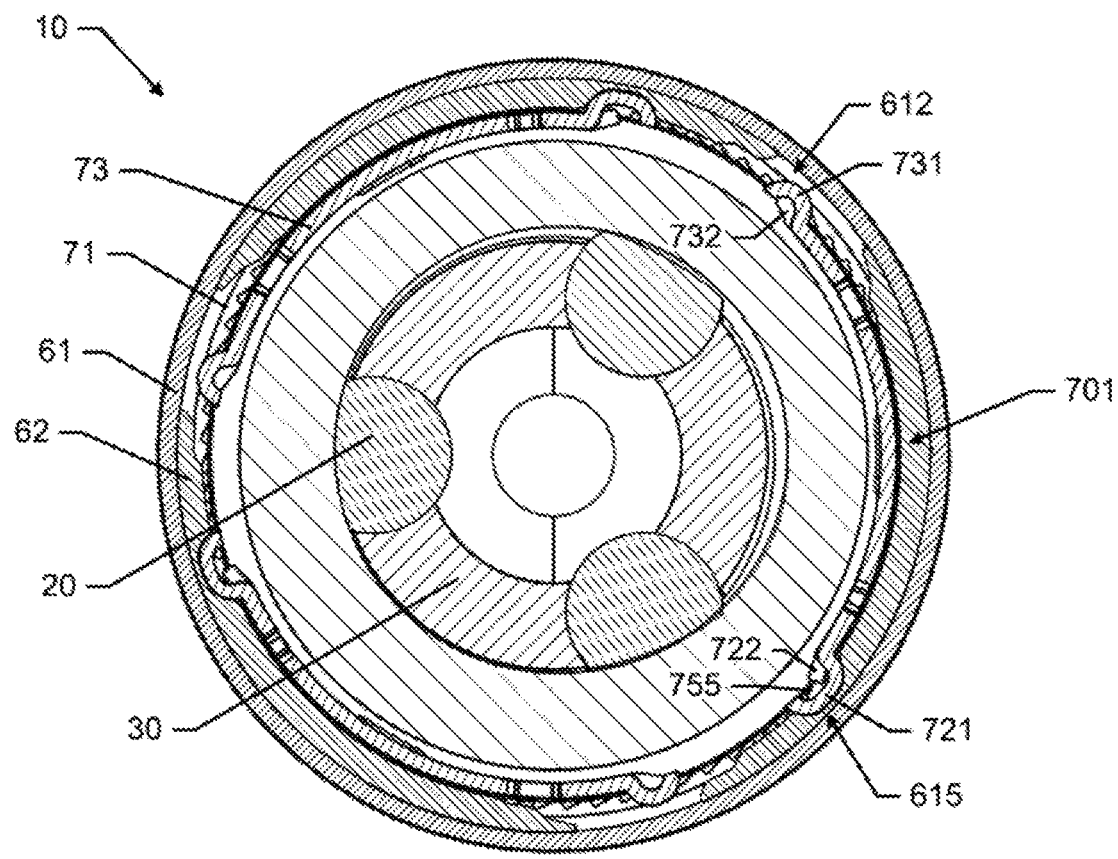
Figure 11B:
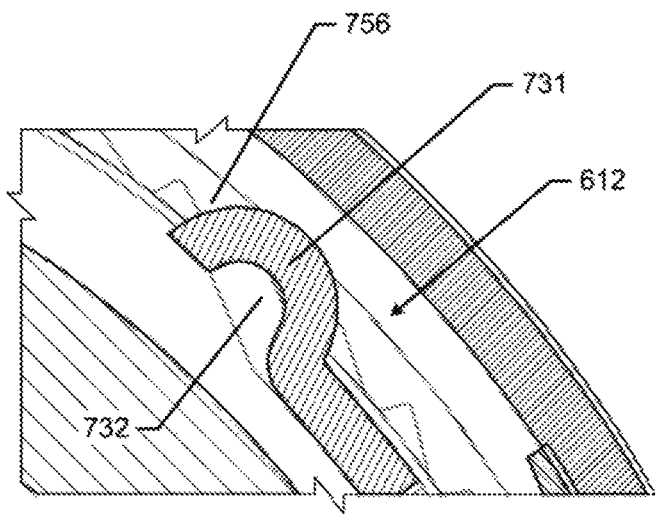
Figure 11C:
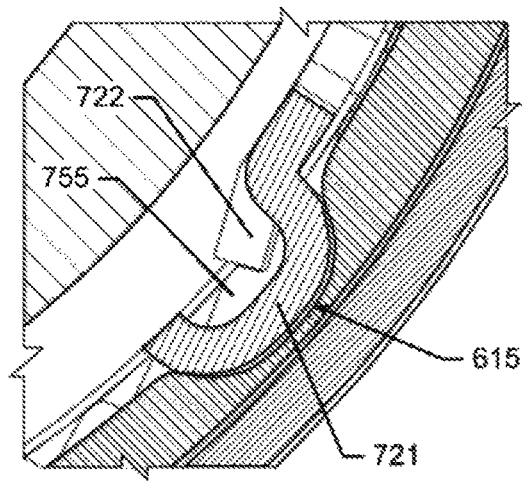
Figure 11D:
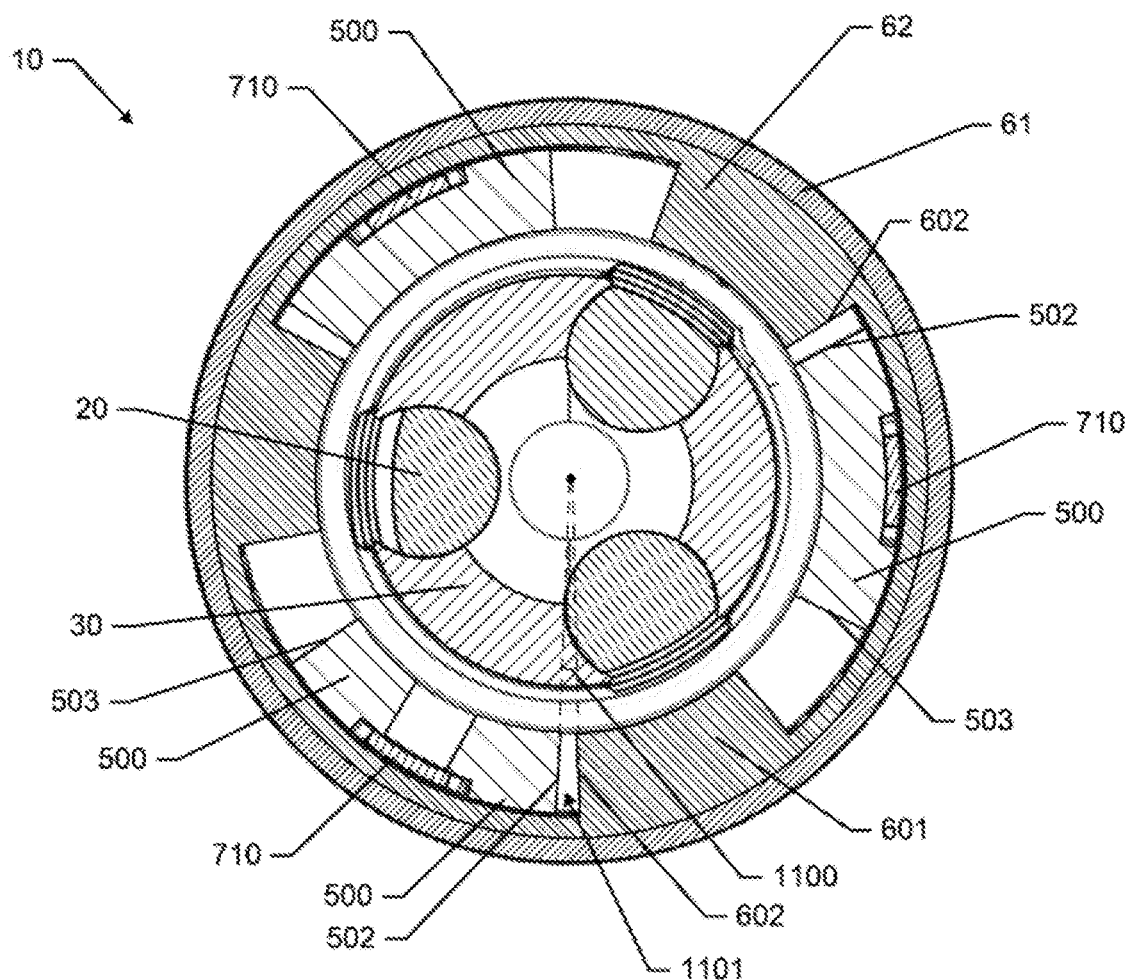
Figure 12A:
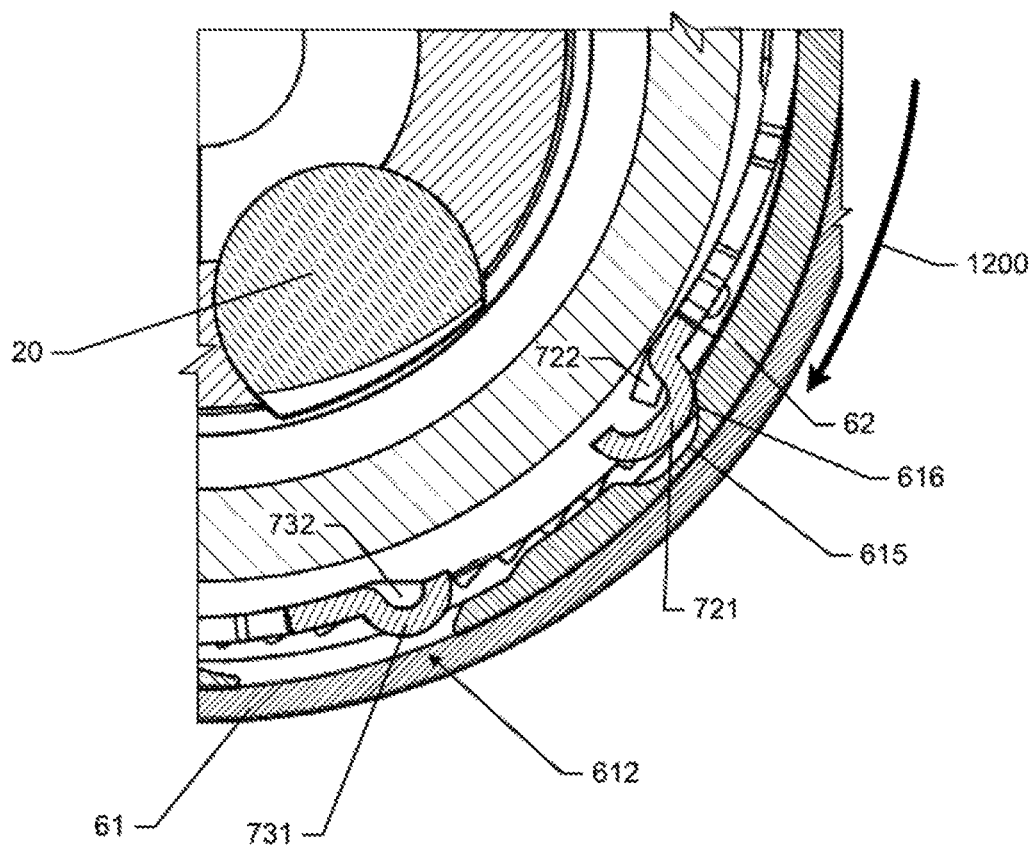
Figure 12B:
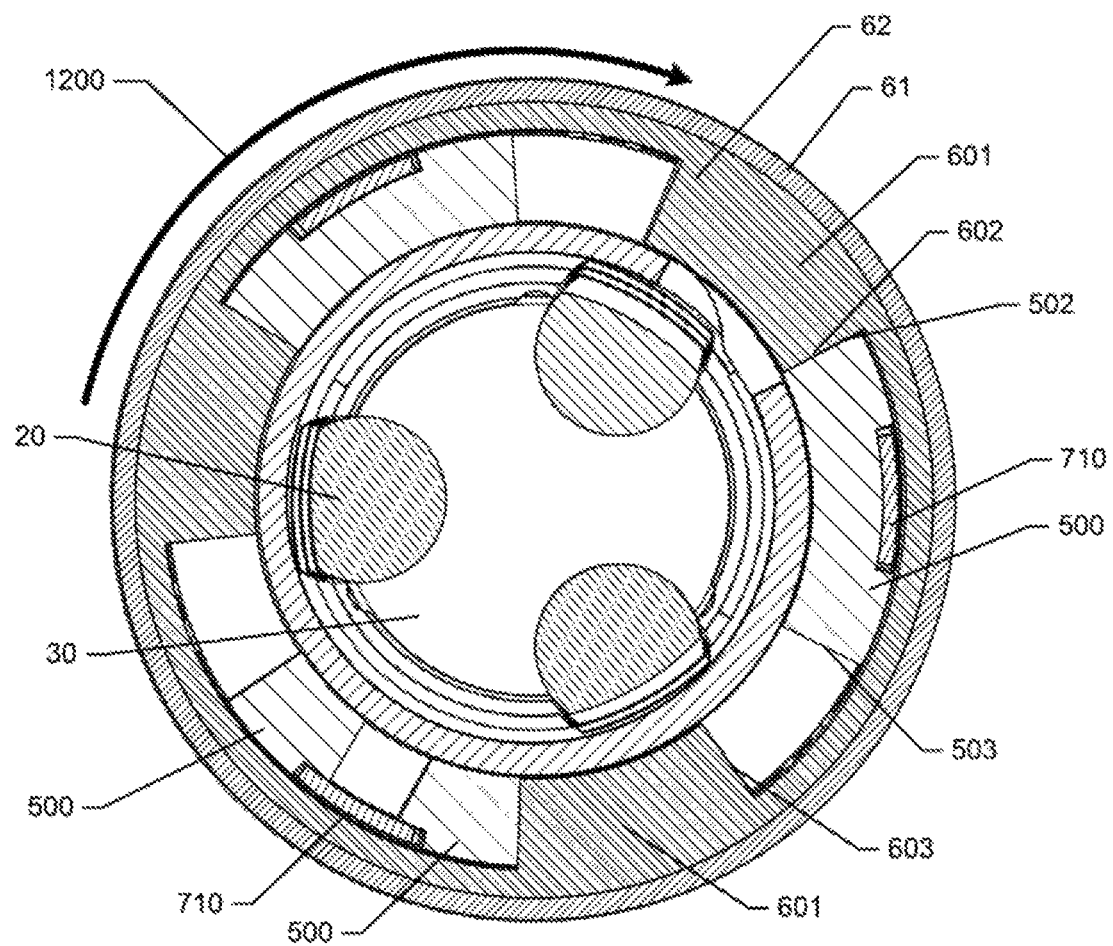
Figure 13A:
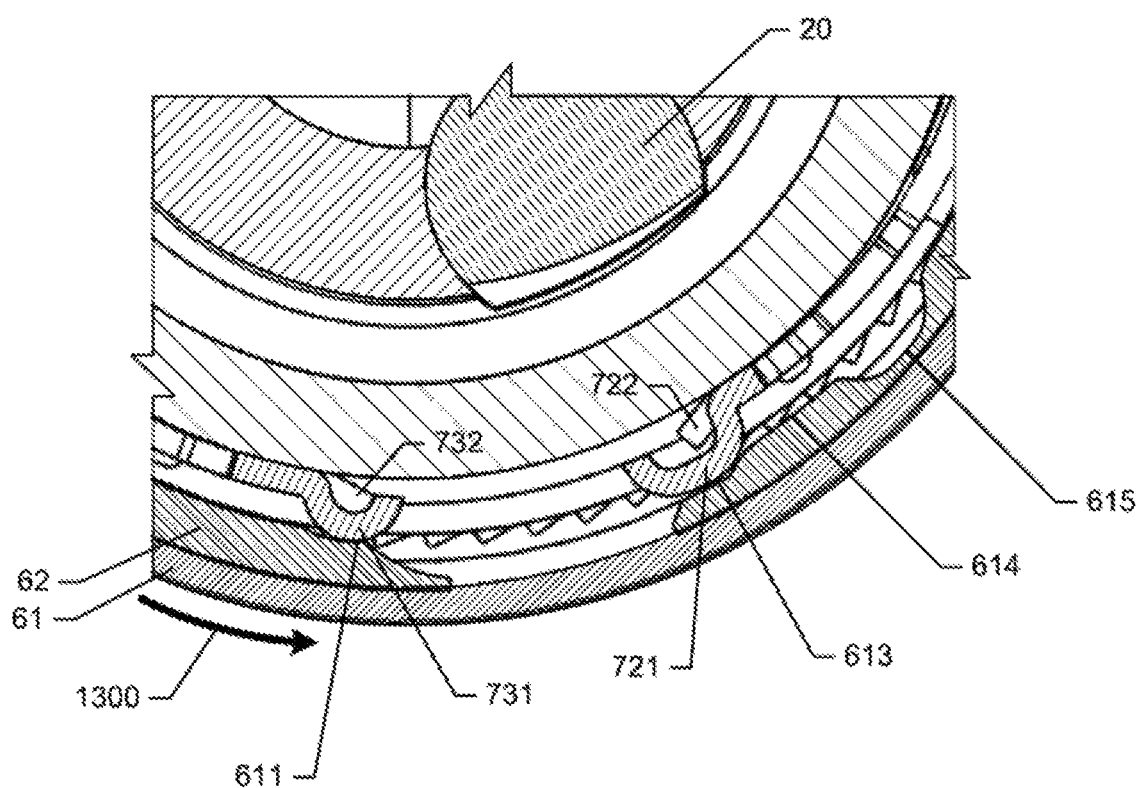
Figure 13B:
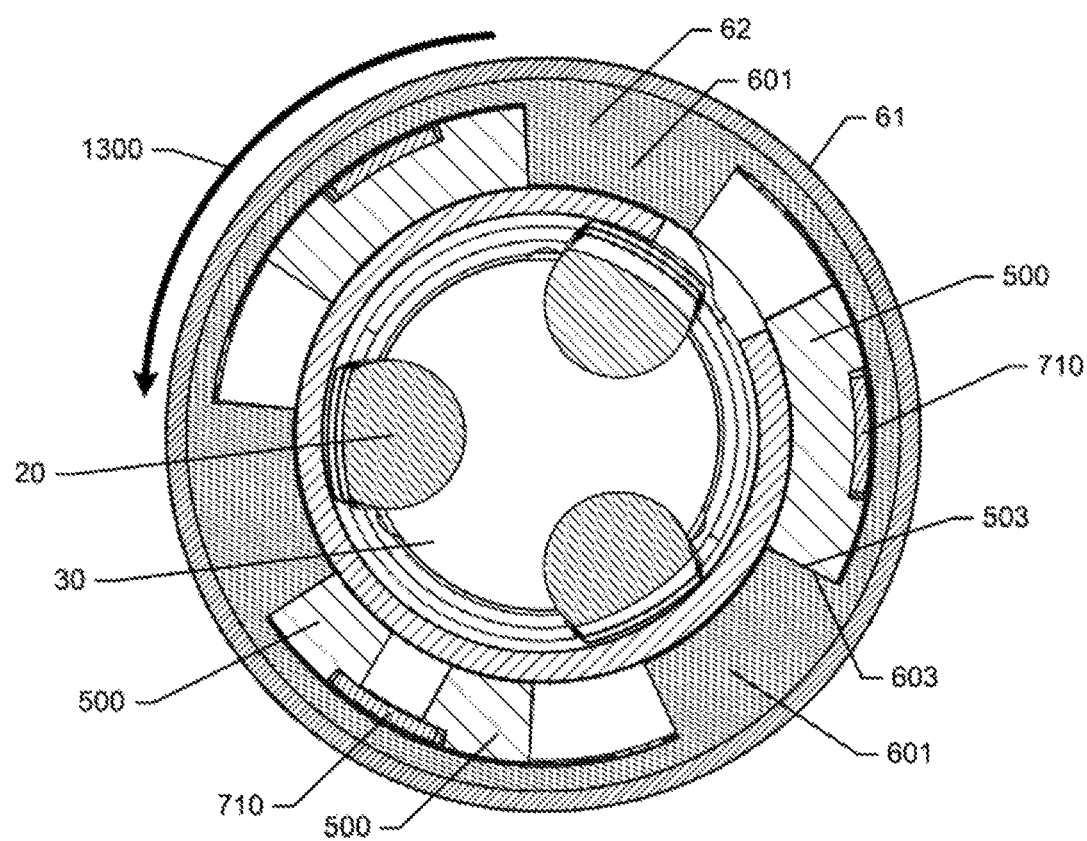

Having thus described some example embodiments in general terms, reference will now be made to the accompanying drawings, which are not necessarily drawn to scale, and wherein:

FIG. 1 illustrates a perspective side view of a chuck in accordance with an example embodiment;

FIG. 2 illustrates a front view of the chuck defining a cross-section A-A in accordance with an example embodiment;

FIG. 3 illustrates cross-section side view of the chuck taken at the plane defined by A-A of FIG. 2 and defining cross-sections C-C and D-D in accordance with an example embodiment in accordance with an example embodiment;

FIG. 4 illustrates a perspective front view of a body of the chuck with a body race in accordance with an example embodiment;

FIG. 5 illustrates an exploded view of a collection of operating components of the chuck in accordance with an example embodiment;

FIG. 6 illustrates a perspective bottom view of sleeve insert of the chuck in accordance with an example embodiment;

FIG. 7 illustrates a perspective side view of a nut of the chuck in accordance with an example embodiment;

FIG. 8 illustrates a perspective side view of a nut race of the chuck with the clutch in a jaw actuating position in accordance with an example embodiment;

FIG. 9A illustrates a front view of a body race of the chuck in accordance with an example embodiment;

FIG. 9B illustrates a zoomed-in perspective side view of teeth of the body race of the chuck in accordance with an example embodiment;

FIG. 9C illustrates a zoomed-in front view of teeth of the body race of the chuck in accordance with an example embodiment;

FIG. 10A illustrates a side view of a nut race assembled with the body race defining a cross-section B-B in accordance with an example embodiment;

FIG. 10B illustrates a cross-section rear view of the nut race assembled with the body race taken at the plane defined by B-B of FIG. 10A in accordance with an example embodiment;

FIG. 11A illustrates a cross-section front view of the chuck in the sleeve locked position taken at the plane defined by C-C of FIG. 3 in accordance with an example embodiment;

FIG. 11B illustrates a zoomed-in, cross-section front view of the click pawl of the chuck in the sleeve locked position taken at the plane defined by C-C of FIG. 3 in accordance with an example embodiment;

FIG. 11C illustrates a zoomed-in, cross-section front view of the lock pawl of the chuck in the sleeve locked position taken at the plane defined by C-C of FIG. 3 in accordance with an example embodiment;

FIG. 11D illustrates a cross-section front view of a sleeve insert and a nut of the chuck in the sleeve locked position taken at the plane defined by D-D of FIG. 3 in accordance with an example embodiment;

FIG. 12A illustrates a zoomed-in, cross-section front view of a click pawl and a lock pawl of the chuck in the tightening position taken at the plane defined by C-C of FIG. 3 in accordance with an example embodiment;

FIG. 12B illustrates a cross-section front view of a sleeve insert and a nut of the chuck in the tightening position taken at the plane defined by D-D of FIG. 3 in accordance with an example embodiment;

FIG. 13A illustrates a zoomed-in, cross-section front view of a click pawl and a lock pawl of the chuck in the sleeve unlocked position taken at the plane defined by C-C of FIG. 3 in accordance with an example embodiment; and FIG. 13B illustrates a cross-section front view of a sleeve insert and a nut of the chuck in the sleeve unlocked position taken at the plane defined by D-D of FIG. 3 in accordance with an example embodiment.

DETAILED DESCRIPTION OF SOME EXAMPLE EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

As mentioned above, chuck over-tightening can be caused by high potential energy in the form of inertia stored in, for example, a sleeve of the chuck. This inertia may be generated by the rotation of a power driver when performing working operations (e.g., drilling a hole, tightening a fastener, or the like), which also rotates the sleeve. Particularly in instances where the sleeve is formed of a heavy material, such as a metal (e.g., steel), the inertia of the sleeve can be substantial. Also, the sudden stops of the power driver can result in the inertia being converted into high forces applied by the sleeve onto other components of the chuck. In this regard, since the sleeve is typically coupled to a threaded nut that engages with corresponding threading on the jaws, the force applied by the sleeve can be transferred to the nut, which can cause unintended tightening of the nut onto the jaws. This tightening can cause a lockup condition where subsequent untightening the nut can be very difficult.

To overcome these challenges, various example embodiments of a chuck are provided that operate to lock the sleeve into a fixed position relative to the nut during operation to prevent the inertia of the sleeve from being transferred to the nut. According to some example embodiments, a locking pawl operably coupled to the nut may be engaged with a lock tooth to hold the nut in a fixed position relative to a body of the chuck. Further, the sleeve may be operably coupled to the locking pawl to also hold the sleeve in a fixed position relative to the body of the chuck. As such, when, for example, the spindle of a power driver stops, the inertia of the sleeve is therefore not transferred to the nut because the sleeve and the nut are, for example, in a locked engagement with the body and the spindle. As such, the force is absorbed into the body due an engagement of the sleeve with the body when the sleeve is in the locked position. Further, when the sleeve is in the locked position, according to some example embodiments, a gap may be disposed between the sleeve and the nut such that a tightening surface of the sleeve is not engaged with a tightening surface of the nut to prevent the sleeve from tightening the nut. According to some example embodiments, the gap may allow for even some tolerances and deforming of the components to further prevent the transfer of force from the sleeve to the nut.

As such, according to some example embodiments, a mechanism may be incorporated into the chuck to integrate a sleeve locking feature that operates to lock the sleeve to prevent further tightening while the chuck is in a working mode (e.g., drilling a hope, driving a fastener, or the like). However, the mechanism, as further described herein, also permits the sleeve to transition into an unlocked mode to permit movement of the sleeve and the nut in a tightening direction (e.g., for low drag) or loosening direction, and into a tightening mode to rotate the sleeve and the nut during a final tightening (e.g., under higher drag). To do so, according to some example embodiments, a nut race (which may also be referred to as an inner race) may include a locking pawl and a click pawl that operate cooperatively with the sleeve to transition the sleeve and the chuck between the locked mode as a default working mode, the unlocked mode for at least loosening the nut via rotation of the sleeve, and the tightening mode for tightening the nut via rotation of the sleeve, as described herein.

In this regard, FIGS. 1 and 2 show an example chuck 10 according to some example embodiments. FIG. 1 is a perspective side view of the chuck 10 and FIG. 2 is s front view of the chuck 10. Generally, the chuck 10 may operate to secure a working bit (not shown) in the jaws 20 of the chuck 10 while the chuck 10 and a power driver affixed to the chuck 10 are working. The chuck 10 may also operate to permit the working bits of varying sizes (e.g., diameters) to be installed and removed by moving the jaws 20 in an opening or closing direction. Further, the chuck 10 may be operably coupled with any type of power driver, including, for example, a pneumatic or electric powered tool (e.g., a drill) configured to rotate a drive spindle that is operably coupled to the chuck 10 in an opening on a rear side of the chuck 10.

The chuck 10 may define a center axis 11, about which the chuck 10 may rotate when in operation, due to rotation of the drive spindle of an attached power driver. For orientation purposes, the chuck 10 may have a forward end 13 and a rearward end 14. The chuck 10 may comprise, among other components, jaws 20, a body 30, a nose 40, and a sleeve 60. As further described herein, the jaws 20 may be configured to move or translate in a closing or opening direction to change the size of a jaw opening between the forward ends of the jaws 20. According to some example embodiments, rotation of the sleeve 60 in the direction 12 may cause the jaws 20, via rotation of a nut, to translate in an opening (loosening) direction to expand the jaw opening to receive a working bit. Further, rotation of the sleeve 60 in a direction opposite to direction 12 may cause the jaws 20, via rotation of the nut in an opposite direction, to translate in a closing (tightening) direction to reduce the jaw opening and clamp onto a working bit.

To better understand the components and operation of the chuck 10, FIG. 3 provides a cross-section side view of the chuck 10 taken at the plane defined by A-A in FIG. 2. Among other components that will be further described herein, the chuck 10 may include the jaws 20, the body 30, a nose 40, a nut 50, the sleeve 60, a bearing assembly 70, and a dust cover 80. The body 30 may be a central component of the chuck 10 that may be operably coupled to the drive spindle of a power driver via a spindle cavity 32. The body 30 may operate to transfer rotation of the drive spindle to the jaws 20 to drive the working bit held within the jaws 20. The jaws 20 may be operably coupled to the body 30 via jaw passageways 31 in the body 30, also shown in FIG. 4, and the jaws 20 may be disposed at a forward end 13 of the chuck 10. Because the jaws 20 are rotationally constrained in the jaw passageways 31 of the body 30, the jaws 20 may rotate with the body 30. However, the jaws 20 may be configured to move or translate relative to the body 30 within the jaw passageways 31 in response to movement of the nut 50.

According to some example embodiments, the nut 50 may include nut threading 51 that is configured to engage with jaw threading 21 on each of the jaws 20. Due to the spiral threaded engagement between the jaws 20 and the nut 50, the jaws 20 may move in the opening (loosening) or closing (tightening) direction depending on the direction (clockwise or counterclockwise) that the nut 50 rotates relative to the body 30. The nut 50 may therefore be configured to rotate relative to the jaws 20 and the body 30. To provide for smooth and low friction rotation of the nut 50, the nut 50 may be operably coupled to the bearing assembly 70. However, the bearing assembly 70 may be configured to perform further features as described below. The nut 50 may also be operably coupled to the sleeve 60.

The sleeve 60 may operate as a user interface for opening and closing the jaws 20. According to some example embodiments, the sleeve 60 may be held in rotational operable coupling with the body 30 by the nose 40 at the forward end 13 of the chuck 10. In this regard, according to some example embodiments, the sleeve 60 may be operably coupled to the nut 50 such that rotation of the sleeve 60, at least in some instances, also rotates the nut 50 to move the jaws 20. As such, rotation of the sleeve 60 may cause the nut 50 to move the jaws 20 such that the jaws 20 clamp onto a working bit or open to permit removal or installation of a working bit.

The sleeve 60 may be comprised of an external sleeve 61 and a sleeve insert 62. The external sleeve 61 and the sleeve insert 62 may be separate components or the components may be integrated into a single sleeve component. The external sleeve 61 may form an outer side surface of the chuck 10. The external sleeve 61 may comprise a hollow cylinder portion, within which internal portions of the chuck 10 may be housed. According to some example embodiments, a dust cover 80 may extend between, for example, the cylindrical portion of the external sleeve 61 at the rearward end 14 of the chuck 10 and the body 30. The cylindrical portion of the external sleeve 61 may, in some example embodiments, be the portion of the sleeve 60 that the user rotates. According to some example embodiments, example embodiments, the external sleeve 61 may also include a narrowing portion and a lip, which may be configured to engage with the sleeve insert 62. The sleeve insert 62 may include various features that are configured to interface with other components of the chuck 10. In this regard, the sleeve insert 62 may be configured to operable couple to the nut 50 and a nut race 73 of the bearing assembly 70, as further described below.

As mentioned above, the chuck 10 may include a bearing assembly 70 that comprises a body race 71, bearings 72, and a nut race 73. One function of the bearing assembly 70 is to ensure low friction rotation of the nut 50 via operation of the bearings 72, which may be greased. The bearings 72 may be ball bearings that are positioned between the body race 71 and the nut race 73. As further described below, the nut race 73 may be operably coupled to the nut 50, such that the nut race 73 and the nut 50 rotate together. Similarly, the body race 71 may be operably coupled to the body 30 such that the body race 71 rotates with the body 30. As such, the bearings 72 may operate as a friction-reducing interface between components coupled to the body 30 and components coupled to the nut 50. However, in addition to facilitating low-friction movement of the nut 50 relative to the body 30, the body race 71 and the nut race 73 also include various features that are configured to operate with the sleeve 60 to perform a sleeve locking operation, as further described herein.

Referring now to FIG. 4, the engagement, according to some example embodiments, between the body race 71 and the body 30 is shown. In this regard, the body 30 and the body race 71 may have complementary engagement features that directly couple to cause the body race 71 to rotate with the body 30. According to some example embodiments, the body race 71 may include one or more tabs 74 that extend into an inner opening of the body race 71. The tabs 74 may be configured to extend into and be received by recesses 33 in the body 30. The recesses 33 may be disposed around a perimeter of a portion of the body 30 that is to support the body race 71. According to some example embodiments, the tabs 74 may be semicircular protrusions and the recesses may be complementary semicircular recesses. The body race 71 may also include inwardly extending teeth 75 disposed on a sidewall of the body race 71. Although FIG. 4 shows the body race 71 as being physically coupled to the body 30, such that the body race 71 and the body 30 rotate together, it is contemplated that example embodiments may include a body race 71 that is permitted to rotate relative to the body 30. For example, the body race 71 may be configured to rotate with the nut race 73 when the nut 50 is able to move freely, and after the nut 50 is tightened, the body race 71 may become fixed on the body 30 due to a friction force between the body race 71 and the body 30.

Now referring to FIG. 5, a collection of operating components of the chuck 10 are shown. More particularly, the sleeve insert 62, the nut 50, the nut race 73, the bearings 72, and the body race 71 are shown. These components are shown in positional relationships based upon how the components are assembled within the chuck 10. In this regard, the body race 71 may form a base for the operating components due to, in some example embodiments, the physical coupling to the body 30 via the tabs 74 as described with respect to FIG. 4. The plurality of bearings 72 may be disposed in a bearing well 76 in a lower internal portion of the body race 71. A ring portion 700 forming a base of the nut race 73 may be disposed atop the plurality of bearings 72. A lower surface of the nut 50 may be disposed on a top surface of the ring portion 700 of the nut race 73. Additionally, the nut race 73 may include nut engagement tabs 710 that slide into complementary tab grooves 501 in the nut 50. The nut 50 may also include one or more nut drive blocks 500, and according to some example embodiments, the tab groove 501 may be formed in an externally facing side of a nut drive block 500.

The nut drive blocks 500 of the nut 50 may engage with internal features of the sleeve insert 62 and an internal upper surface of the sleeve insert 62 may be disposed on the top surfaces of the nut drive blocks 500. While also referencing FIG. 7, the nut drive blocks 500 may be spaced around a top surface of the nut 50. The nut drive blocks 500 may be spaced apart (e.g., equally spaced), such that nut drive voids 504 are disposed between the nut drive blocks 500.

In this regard, FIG. 6 shows a perspective view of the sleeve insert 62 from a perspective bottom view to show the features on the interior of the sleeve insert 62. When assembled, the nut drive blocks 500 may be disposed in sleeve drive voids 604 disposed around a periphery of an internal ledge 605 of the sleeve insert 62. Sleeve drive blocks 601 may also be disposed along the periphery of the internal ledge 605, such that the sleeve drive voids 604 are disposed between the sleeve drive blocks 601. According to some example embodiments, the sleeve drive blocks 601 may be spaced apart by the same distance such that the centers of each of the sleeve drive blocks 601 form the apexes of an equilateral triangle. As such, the arc lengths of the sleeve drive voids 604 may also be equal in length and spaced apart with the centers of the sleeve drive voids 604 forming apexes of equilateral triangles. The sleeve drive blocks 601 may have engaging surfaces on either side of each sleeve drive block 601. In this regard, each sleeve drive block 601 may comprise a sleeve loosening surface 603 on a first side of a sleeve drive block 601 and a sleeve tightening surface 602 on a second, opposite side of the sleeve drive block 601. According the some example embodiments, since the sleeve drive blocks 601 may be formed on the interior circular wall of the sleeve insert 62, a cross-section of a sleeve drive block 601 may have the shape of a segment of an annulus with the sides of the segment being angled towards a center of the annulus (i.e., at the center of rotation of the chuck 10).

Also, when the chuck 10 is assembled, the nut drive blocks 500 of the nut 50 may engage with and be disposed within the sleeve drive voids 604 of the sleeve insert 62. As shown in FIG. 7, the nut drive blocks 500 may also be disposed along a top circular ring of the nut 50. Nut drive voids 504 may be disposed between the nut drive blocks 500. According to some example embodiments, the nut drive blocks 500 may be spaced apart by the same distance such that the centers of each of the nut drive blocks 500 form the apexes of an equilateral triangle. As such, the arc lengths of the nut drive voids 504 may also be equal in length and spaced apart with the centers of the nut drive voids 504 forming apexes of equilateral triangles. The nut drive blocks 500 may have engaging surfaces on either side of each nut drive block 500. In this regard, each nut drive block 500 may comprise a nut loosening surface 503 on a first side of a nut drive block 500 and a nut tightening surface 502 on a second, opposite side of the nut drive block 500. According the some example embodiments, since the nut drive blocks 500 are formed on a ring, a cross-section of a nut drive block 500 may have the shape of a segment of an annulus with the sides of the segment being angled towards a center of the annulus (i.e., at the center of rotation of the chuck 10).

To rotate the nut 50, the external sleeve 61 may be rotated by the user, which also rotates the sleeve insert 62. When the sleeve insert 62 rotates, the sleeve drive blocks 601 also rotate within the nut drive voids 504. Rotation of the sleeve drive blocks 601 within the nut drive voids 504 may continue until the sleeve drive blocks 601 move into physical contact with a side surface of the nut drive blocks 500 (e.g., the nut tightening surface 502 for a tightening direction rotation or the nut loosening surface 503 for a loosening direction rotation). Note that according to some example embodiments, the length (or arch length) of the nut drive voids 504 may be larger than the length (or arc length) of the sleeve drive blocks 601, and therefore some amount of rotation in either direction may be occur within the nut drive voids 504 before the sleeve drive blocks 601 come into physical contact with the nut drive blocks 500.

Referring now to FIG. 8, the nut race 73 may include various features that physically interface with the nut 50, the sleeve insert 62, the bearings 72, and the body race 71. Such features may operate to perform a sleeve locking function to inhibit rotation of the sleeve 60 when the sleeve 60, and thus the chuck 10, are a sleeve locked position. Additionally, the features of the nut race 73 may also interface with the other components to permit a tightening function when the sleeve 60, and thus the chuck 10, are in a tightening position. Finally, the features of the nut race 73 may also interface with the other components to permit unlocked functionality (free rotation in either direction) when the sleeve 60, and thus the chuck 10, are in a sleeve unlocked position.

With respect to the various features, according to some example embodiments, the nut race 73 may comprise nut engagement tab 710. According to some example embodiments, the nut race 73 may comprise three nut engagement tabs 710, where each nut engagement tab 710 extends substantially perpendicular to a ring portion 700 disposed at a base of the nut race 73. A nut engagement tab 710 may be configured to slide, in an axial direction, into a tab groove 501 of the nut 50. Via this physical coupling of the nut engagement tab 710 with the tab groove 501, the nut race 73 and the nut 50 may rotate together (i.e., the engagement of the nut engagement tab 710 with the tab groove 501 may prevent rotation of the nut 50 relative to the nut race 73).

As mentioned above, the nut race 73 may also physically contact the bearings 72. The bearings 72, according to some example embodiments, may be a plurality of ball bearings that are oriented in a circular shape due to placement in the bearing well 76 of the body race 71. As such, the bottom surface of the ring portion 700 at the base of the nut race 73 may be curved or angled to facilitate contact with the bearings 72 to permit rotational movement of the nut race 73 on the bearings 72.

Additionally, when assembled in the chuck 10, the features of the nut race 73 may also operably couple with the sleeve insert 62 and the body race 71. In this regard, according to some example embodiments, the nut race 73 may include a plurality of click-lock assemblies 701. According to some example embodiments, a nut race 73 may include three click-lock assemblies 701. A click-lock assembly 701 may, according to some example embodiments, include a nut engagement tab 710. Additionally, the click-lock assembly 701 may comprise a click tang 730, a click pawl control member 731, and a click pawl 732. The click-lock assembly 701 may also include a lock tang 720, a lock pawl control member 721, and a lock pawl 722.

The click pawl 732 may be one portion of a ratchet that, when engaged, permits the nut race 73 and the nut 50 to rotate in a tightening direction, but prevent movement in a loosening direction. In this regard, click pawl 732 may be, for example, a spring-biased angled tooth that is configured to engage with one of a plurality of click teeth 756 of the body race 71, as shown in FIG. 9A. The click pawl control member 731 may be configured to control the engagement of the click pawl 732 with the click teeth 756. According to some example embodiments, the click pawl control member 731 may be disposed, with the click pawl 732, at an end of a click tang 730 that may be formed of a material (e.g., a metal or plastic) that is flexible. The other end of the click tang 730 may be affixed to the nut race 73 in a manner that permits the click tang 730 to flex between an tooth engaged position and a tooth disengaged position. According to some example embodiments, the click tang 730 may be affixed to a nut engagement tab 701 and may extend to an unconnected end with the click pawl control member 731 and the click pawl 732 along a partial circular path along the periphery of the ring portion 700. The click pawl control member 731 may comprise a protrusion (e.g., in the form of a C-shaped bend) that extends radially outward from a center of the nut race 73. The protrusion may have a rounded externally-facing surface to facilitate sliding engagement with corresponding features of the sleeve insert 62.

Oriented in an opposite rotational direction, the lock pawl 722 may be one portion of a lock that, when engaged, prevents movement of the nut 50 in a tightening direction. As such, when the lock pawl 722 is engaged, the nut 50 cannot be further tightened onto the jaws 20 and therefore, any inertia form the sleeve 60 cannot be transferred from the sleeve 60 to the nut 50 when the lock pawl 722 is engaged. In this regard, lock pawl 722 may be, for example, a spring-biased angled tooth that is configured to engage with one of a plurality of lock teeth 755 of the body race 71, as shown in FIG. 9A. The lock pawl control member 721 may be configured to control the engagement of the lock pawl 722 with the lock teeth 755. According to some example embodiments, the lock pawl control member 721 may be disposed, with the lock pawl 722, at an end of a lock tang 720 that may be formed of a material (e.g., a metal or plastic) that is flexible. The other end of the lock tang 720 may be affixed to the nut race 73 in a manner that permits the lock tang 720 to flex between an tooth engaged position and a tooth disengaged position. According to some example embodiments, the lock tang 720 may be affixed to a nut engagement tab 701 and may extend to an unconnected end with the lock pawl control member 721 and the lock pawl 722 along a partial circular path along the periphery of the ring portion 700. The lock pawl control member 721 may comprise a protrusion (e.g., in the form of a C-shaped bend) that extends radially outward from a center of the nut race 73. The protrusion may have a rounded externally-facing surface to facilitate sliding engagement with corresponding features of the sleeve insert 62. The lock tang 720 may extend away from the nut engagement tab 710 in an opposite direction from the click tang 730.

Because the nut race 73 may include a plurality of click-lock assemblies 701, a click pawl 732 or a lock pawl 722 may be engaged with a click tooth 756 or a lock tooth 755, respectively, disposed at a number of different locations on the body race 71. Due to the redundancy associated with having a number of click-lock assemblies 701, one or more click pawls 732 may be rotated into a position where at least one of the click pawls 732 is engaged with a click tooth 756. As such, the positioning of the click pawls 732 and the positioning of the click teeth 756 may be such that at least one click pawl 732 is always rotationally positioned for possible engagement with a click tooth 756. Similarly, due to the redundancy associated with having a number of click-lock assemblies 701, one or more lock pawls 722 may be rotated into a position where at least one of the lock pawls 722 is engaged with a lock tooth 755. As such, the positioning of the lock pawls 722 and the positioning of the lock teeth 756 may be such that at least one lock pawl 722 is always rotationally positioned for possible engagement with a lock tooth 755.

Referring back to FIG. 6, the sleeve insert 62 may further include a number of sets of control member engagement features 610. In this regard, on an interior wall of the sleeve insert 62, a collection of recessed features and voids may be included that operate to radially move a control member of the nut race 73 to cause a related pawl to engage or disengage with a respective tooth of the body race 71. In this regard, according to some example embodiments, a chuck 10 may comprise an equal number of sets of control member engagement features 610 and click-lock assemblies 701. Distances between the control member engagement features of the sleeve insert 62 may correspond with the distance between the control members of the nut race 73 to cause different functionalities due to the relative rotational positioning of the control member engagement features with the control members. As such, a set of control member engagement features 610 may comprise a click ramp 611, a click void 612, a lock ramp 613, a lock surface 614, a lock recess 615, and a tightening lock ramp 616.

The click ramp 611 may be configured to engage with a respective click pawl control member 731 to flex a click tang 730 inwardly to disengage a click pawl 732 from a click tooth 756 as further described herein. The click void 612, disposed adjacent to the click ramp 611, may be an opening or gap in the wall of the sleeve insert 62 where the click pawl control member 731 is not engaged with a surface of the sleeve insert 62 allowing the click tang 730 to flex outward to a default position when the click pawl 732 is positioned for engagement with a click tooth 756.

The lock ramp 613 may be configured to engage with a respective lock pawl control member 721 to flex a lock tang 720 inwardly and disengage a lock pawl 722 from a lock tooth 755 as further described herein. The lock surface 614, disposed adjacent to the lock ramp 613, may be a further region where the respective lock pawl control member 721 is slideably engaged and is forced to flex the lock tang 720 inwardly to disengage a lock pawl 722 from a lock tooth 755 as further described herein. The lock recess 615 may be a cutout or recessed feature of the sleeve insert 62 that may be configured to receive the lock pawl control member 721 at a depth that permits the lock pawl 722 to engage with a lock tooth 755. The lock recess 615 may be disposed adjacent to the lock surface 614. Further, tightening lock ramp 616 may be adjacent to the lock recess 615 and may be an edge of the lock recess 615. The lock pawl control member 721 may be configured to slide up the tightening lock ramp 616 to disengage the lock pawl 722 from a lock tooth 755 to permit further tightening of the nut 50 on the jaws 20 while the lock pawl 722 is disengaged. Due to the slope of the tightening lock ramp 616 and the bias on the lock pawl control member 721, the sleeve insert 62 may be forced to rotate and the lock pawl control member 721 may automatically slide back into the lock recess 615 when no rotational force is applied by a user on the sleeve 60 after the lock pawl control member 721 is engaged with the tightening lock ramp 616.

Now referring to FIGS. 9A and 9B, the positioning and structure of the teeth of the body race 71 is described in according to some example embodiments. In this regard, according to some example embodiments, body race 71 may include a number of click teeth 756 and a number lock teeth 755, both of which may be disposed in a common plane. According to some example embodiments, the click teeth 756 and the lock teeth 755 may be disposed on an internal wall of the body race 71. The click teeth 756 and the lock teeth 755 may be organized on the body race 71 in a number of different ways according to various different example embodiments. For example, the click teeth 756 and the lock teeth 755 may be interleaved in between each other, such that every other tooth is a click tooth 756 and every other tooth is a lock tooth 755. According to some example embodiments, the click teeth 756 and the lock teeth 755 may be grouped in a click teeth group 758 and a lock teeth group 757. In this regard, the click teeth 756 may form a first continuous series of teeth and the lock teeth 755 may form a second continuous series of teeth. The teeth may therefore transition from click teeth 756 to lock teeth 755 at 753, and then transition from lock teeth 755 to the click teeth 756 at 754. According to some example embodiments, each tooth may be spaced equally around the circumference of the inner wall of the body race 71. Additionally, according to some example embodiments, the click teeth 756 may make up two-thirds of the teeth 75 (e.g., 48 teeth) and the lock teeth 755 may make up one-third of the teeth 75 (e.g., 24 teeth). In this configuration, considering the three click-lock assemblies 701 and the relative spacing of the click pawls 732 and the lock pawls 722, at least one lock pawl 722 and at least one click pawl 732 may always be in a position to engage with a lock tooth 755 and a click pawl 756, if permitted to do so by the positioning of the control members of the nut race 73 with the control member engagement features of the sleeve insert 62.

Now referring to FIG. 9B, the structure of a click tooth 756 and the structure of a lock tooth 755, according to some example embodiments, will be described. As mentioned above, the teeth 75 of the body race 71 may be disposed on an inner surface of a wall 751 of the body race 71. In this regard, FIG. 9B provides a zoomed-in view of the tooth transition 753 which shows an example of a click tooth 756 and a lock tooth 755.

The click tooth 756 may comprise a click guide ramp 772, a click stopping edge 771 and, an inter-tooth peak 773. The click guide ramp 772 may be an angled surface that operates to either guide the click pawl 732 into a click stopping edge 771 (of the next tooth) to form a stopping engagement (due to the corresponding engaging surface of the click pawl 732) when forced in a loosening direction, or guide the click pawl 732 up to an inter-tooth peak 773, for subsequent ratcheting to an adjacent tooth when forced in a tightening direction. As such, the click stopping edge 771 may be oriented to face in a first rotational direction. As mentioned above, the click stopping edge 771 may be angled to correspond to the angle of an engaging surface of the click pawl 732 to cause a stopping engagement, unless the click pawl 732 is pulled inwardly (i.e., toward the center of rotation) to translate the click pawl 732 out of engagement with the click stopping edge 771. Also, it is noted that the lock pawl 722 is oriented to engage a surface facing the opposite direction to the click stopping edge 771. As such, when the nut race 73 is rotated in the loosening direction, the lock pawl 722 skips against the inter-tooth peak 773 without engaging. Further, when the nut race 73 is rotated in the tightening direction, the lock pawl 722 may engage with the click guide ramp 722 but may slide up the click guide ramp 722 to an inter-tooth peak 773 and then jump to the next click tooth 756.

Similarly, a lock tooth 755 may comprise a lock guide ramp 762, a lock stopping edge 761 and, an inter-tooth peak 763. The lock guide ramp 762 may be an angled surface that operates to either guide the lock pawl 722 into a click stopping edge 761 (of the next tooth) to form a stopping engagement (due to the corresponding engaging surface of the lock pawl 722) when forced in a tightening direction, or guide the lock pawl 722 up to an inter-tooth peak 763, for subsequent ratcheting into an adjacent tooth when forced in a loosening direction. As mentioned above, the lock stopping edge 761 may be angled to correspond to the angle of an engaging surface of the lock pawl 722 to cause a stopping engagement, unless the lock pawl 722 is pulled inwardly (i.e., toward the center of rotation) to translate the lock pawl 722 out of engagement with the lock stopping edge 761. As such, the lock stopping edge 761 may be oriented to be facing in a second rotational direction. Also, it is noted that the click pawl 732 is oriented to engage a surface facing the opposite direction to the lock stopping edge 761. As such, when the nut race 73 is rotated in the loosening direction, the click pawl 732 skips against the inter-tooth peak 763 without engaging. Further, when the nut race 73 is rotated in the tightening direction, the click pawl 732 may engage with the lock guide ramp 762 but may slide up the lock guide ramp 762 to an inter-tooth peak 763 and then jump to the next lock tooth 755.

As such, due to the structure, if a click pawl 732 is engaged with a lock tooth 755, it can be seen that the click pawl would not stoppably engage with any surface of the lock tooth 755 and therefore the click pawl 732 may be free to move in either direction when engaged with a lock tooth 755. Additionally, if a lock pawl 722 is engaged with a click tooth 756, it can be seen that the lock pawl would not stoppably engage with any surface of the click tooth 756 and therefore the lock pawl 722 may be free to move in either direction when engaged with a click tooth 756.

As shown in FIG. 9B, the click stopping edge 771 is not symmetric with the click guide ramp 772. In this regard, the length of the click stopping edge 771 is less than the length of the click guide ramp 772. Additionally, the magnitude of the slope of the click stopping edge 771 is greater than a magnitude of the slope of the click guide ramp 772. Similarly, the lock stopping edge 761 is not symmetric with the lock guide ramp 762. In this regard, the length of the lock stopping edge 761 is less than the length of the lock guide ramp 762. Additionally, the magnitude of the slope of the lock stopping edge 761 is greater than a magnitude of the slope of the lock guide ramp 762.

Now referring to FIG. 9C, an example embodiment is shown where the structure of the teeth 780 of the body race 71 are symmetrical or substantially symmetrical (e.g., due to curvature). As such, the each tooth 780 may operate as both a click tooth and a lock tooth. In this regard, according to some example embodiments, each tooth 780 may comprise a click stopping edge 782 and a lock stopping edge 781. As such, the engaging surface of the click pawl 732 may be formed with an angle that corresponds to the angle of the click stopping edge 782, and the engaging surface of the lock pawl 722 may be formed with an angle that corresponds to the angle of the lock stopping edge 781. Accordingly, the click stopping edge 782 may operate as a lock guide ramp for the lock pawl 722, and the lock stopping edge may operate as a click guide ramp for the click pawl 732. Each tooth 780 may have an inter-tooth peak 783. According to some example embodiments, the lengths of the click stopping edge 782 and the lock stopping edge 781 may be same (or substantially the same) and the magnitudes of the slopes of the click stopping edge 782 and the lock stopping edge 781 may be same (or substantially the same). Accordingly, in some example embodiments, all of the teeth of the body race 71 may be structured in the same or similar manner, and the click pawl 732 or lock pawl 722 may be configured to engage with any tooth of the body race 71.

Now referring to FIG. 10A, a side view of the nut race 73 assembled with the body race 71 is provided. As can be seen, a lower portion of the nut race 73 may be seated within the perimeter wall of the body race 71. As such, the click pawls 732 and the lock pawls 722 may be positioned to engage with the teeth of the body race 71, while the click pawl control member 731 and the lock pawl control member 721 are disposed above the perimeter wall of the body race 71 to permit engagement of the click pawl control member 731 and the lock pawl control member 721 with the sleeve insert 62. Additionally, the nut engagement tabs 710 also extend above the body race 71 to permit engagement with the nut 50.

Now referring to FIG. 10B, a cross-section of the assembly shown in FIG. 10A taken a B-B is shown. As such, the FIG. 10B shows the engagement of the click pawls and the lock pawls with the teeth of the body race 71. In this regard, view each of the three click-lock assemblies 701 are shown and referenced as click-lock assembly 701a, click-lock assembly 701b, and click-lock assembly 701c. With respect to the engagement of pawls with the teeth of the body race 71, it can be seen that click pawl 732a, biased by click tang 730a, is engaged with a click tooth 756 and this engagement would prevent rotation in a loosening direction. Additional, due to the current rotational placement of the nut race 73 relative to the body race 71, the lock pawl 722a is not engaged because the lock pawl 722a is aligned with a click tooth 756. With respect to click-lock assembly 701b, due to the current rotational placement of the nut race 73 relative to the body race 71, the click pawl 732b is not engaged because click pawl 732b is aligned with a lock tooth 755, and lock pawl 722b is not engaged because the lock pawl 722b is aligned with a click tooth 756.

However, in this example rotational placement of the nut race 73 relative to the body race 71 both pawls of click-lock assembly 701c are engaged with a respective tooth. In this regard, click pawl 732c, under the biasing provided by click tang 730c, is engaged because click pawl 732c is aligned with a click tooth 756, and therefore this engagement prevents the nut race 73 from rotating in the loosening direction. Additionally, lock pawl 722c is engaged because the lock pawl 722c is aligned with a lock tooth 755, and therefore this engagement prevents the nut race 73 from rotating in the tightening direction (e.g., prevents inertia of the sleeve 60 from causing a tightening force to be applied to the nut 50 in response to a stoppage of rotation).

As further described below, the click pawl control members 731a, 731b, and 731c can be seen extending beyond the external wall of the body race 71. As such, it can be seen that if a feature of the sleeve insert 62 was to apply an inward force (i.e., towards the center) on a click pawl control member 731a. 731b, or 731c, the click pawl control member 731a, 731b, or 731c would transfer an inward force to a respective click pawl 732a. 732b, or 732c (e.g., via the respective click tang and against outward directed biasing of click tang). As a result, the click pawl 732a. 732b, or 732c may be caused to transition into a disengaged position (e.g., from being engaged to being disengaged), due to a corresponding movement inward of the click pawl 732a. 732b, or 732c. Additionally, the lock pawl control members 721a, 721b, and 721c can be seen extending beyond the external wall of the body race 71. As such, it can be seen that if a feature of the sleeve insert 62 was to apply an inward force (i.e., towards the center) on a lock pawl control member 721a, 721b, or 721c, the lock pawl control member 721a, 721b, or 7231c would transfer an inward force to a respective click pawl 732a, 732b, or 732c (e.g., via a respective lock tang and against outward directed biasing of lock tang). As a result, the lock pawl 722a, 722b, or 722c may be caused to transition into a disengaged position (e.g., from being engaged to being disengaged), due to a corresponding movement inward of the lock pawl 722a, 722b, or 722c.

Based on the configuration of example embodiments of the chuck 10 as described herein, rotation of the sleeve 60 (e.g., and more specifically, the external sleeve 61) can cause the sleeve 60 and the chuck 10 to being one of three different operational modes. The three operational modes may be a sleeve locked position, a tightening position, and a sleeve unlocked position. The sleeve locked position may be defined as a position where the sleeve 60 is prevented from causing the nut 50 to be further tightened in response to a tightening direction force caused by inertia in the sleeve 60. Additionally, according to some example embodiments, in the sleeve locked position, the sleeve 60 may also be prevented from loosening due to, for example, a loosening direction force caused by inertia in the sleeve 60. According to some example embodiments, to transition from, for example, the sleeve locked position to another operational mode, a user may apply a rotational force that exceeds a threshold force to cause the transition.

In this regard, by applying more than a threshold force in the tightening direction, the chuck 10 and the sleeve 60 may transition into the tightening mode and associated tightening position. In the tightening position, the nut 50 may be permitted to further tighten in response to rotation of the sleeve 50. Further, according to some example embodiments, the nut 50 may be permitted rotate in a tightening direction, in a ratcheting manner, but prevent rotation in a loosening direction. According to some example embodiments, upon completion of a tightening operation for the chuck 10, the chuck 10 may automatically revert back into the sleeve locked position from the tightening position in the absence of a rotational force to maintain the chuck 10 in the tightening position. As such, according to some example embodiments, a biasing feature may be implemented that causes the chuck 10 to revert back to the sleeve locked position from the tightening position, when a user stops providing a rotational force in the tightening direction.

Finally, the chuck 10 may be transitioned from the sleeve locked position to a sleeve unlocked position. In the sleeve unlocked position, the sleeve 60 and the nut 50 are permitted to move in either the tightening or loosening direction. In other words, the nut 50 may be free to rotate, uninhibited, in either rotational direction. With respect to the loosening direction, a user may be able to provide a loosening direction force to the external sleeve 61 to rotate the nut 50 in the loosening direction. According to some example embodiments, any amount of torque may be applied in the loosening direction, while in the sleeve unlocked position, and no change in operational mode may occur. However, while in the sleeve unlocked position, the rotation in the tightening direction may cause an operational mode transition, once a threshold torque is applied (e.g., due to the nut 50 being sufficiently tightened onto the jaws 20). As such, if the threshold torque in the tightening direction is exceeded, then the chuck 10 may transition into the sleeve locked position. Continued torque in the tightening direction may further transition the chuck 10 into the tightening position, where any amount of tightening torque may be applied.

A description of FIGS. 11A to 13B will now be provided which illustrate the chuck 10 in positions for each of the operational modes. In this regard, FIGS. 11A-11D illustrate aspects of the chuck 10 while in the sleeve locked position. FIGS. 12A-12B illustrate aspects of the chuck 10 while in the tightening position. Finally, FIGS. 13A-13B illustrate aspects of the chuck 10 while in the sleeve unlocked position.

Referring to FIGS. 11A-11C, FIG. 11A shows a cross-section of the chuck 10 taken at C-C of FIG. 3 with the chuck 10 in a sleeve locked position is shown. FIG. 11B is a zoomed-in view of the click pawl 732 and surrounding environment from FIG. 11A, and FIG. 11C is a zoomed-in view of the lock pawl 722 and surrounding environment from FIG. 11A.

In this regard, while in the sleeve locked position, to prevent the sleeve 60 (i.e., the external sleeve 61 and the sleeve insert 62) from rotating in the loosening direction, at least one click pawl 732 of a click-lock assembly 701 may be engaged with a click tooth 756. The click pawl 732 may be engaged with the click tooth 756 (or any tooth for that matter) because the click pawl control member 731 may be disposed within the click void 612 of the sleeve insert 62. The clock void 612 permits the click pawl control member 731 to deflect outward by an amount that permits the click pawl 732 to engage with a tooth, such as a click tooth 756, of the body race 71.

In this regard, while in the sleeve locked position, to prevent the sleeve 60 (i.e., the external sleeve 61 and the sleeve insert 62) from rotating in the tightening direction, at least one lock pawl 722 of a click-lock assembly 701 may be engaged with a lock tooth 755. The lock pawl 722 may be engaged with the lock tooth 755 (or any tooth for that matter) because the lock pawl control member 721 may be disposed within the lock recess 615 of the sleeve insert 62. The depth of the lock recess 615 permits the lock pawl control member 721 to deflect outward by an amount that permits the lock pawl 722 to engage with a tooth, such as a lock tooth 755, of the body race 71.

FIG. 11D illustrates a cross-section view of the chuck 10 taken at D-D of FIG. 3 with the chuck 10 in the sleeve locked position. In particular, FIG. 11D illustrates the placement of the nut drive blocks 500 of the nut 50 and the sleeve drive blocks 601 of the sleeve insert 62, when the chuck 10 is in the sleeve locked position. In this regard, according to some example embodiments, the nut drive blocks 500 and the sleeve drive blocks 601 are not in contact with each other when the chuck 10 is in the sleeve locked position.

The position of the nut 50 and the sleeve insert 62 may correspond to the positions of the click pawl control members 731 and the lock pawl control members 721 as shown in FIGS. 11A-11C. As such, the position of the lock recess 615 may be selected to place a gap 1101 between a nut drive block 500 and a sleeve drive block 601. More specifically, the gap 1101 may be formed between nut tightening surface 502 of the nut drive block 500 and the sleeve tightening surface 602 of the sleeve drive block 601. According to some example embodiments, the gap 1101 may have an angle 1100 of about three degrees. The gap 1101 may function to further prevent the inertia of the sleeve 60 (i.e., external sleeve 61 and sleeve insert 62) from causing the nut 50 to inadvertently tighten. In this regard, in addition to the lock pawl 722 being engaged with a lock tooth 755, the gap 1101 may allow for some minimal movement of the sleeve insert 62 (e.g., due to force-related deformation of the components, or the like) without physically engaging with the nut 50.

FIG. 12A will now be described which shows a zoomed-in view of the lock pawl 722 and click pawl 732 in a cross-section view of the chuck 10 while in the tightening position. In this regard, it can be presumed that the chuck 10 was previously in the sleeve locked position. Upon rotation of the external sleeve 61 in the tightening direction 1200 beyond a torque threshold, the lock pawl control member 721 may slide out of the lock recess 615 and up the tightening lock ramp 616. In doing so, the lock pawl control member 721 may be forced inward thereby putting the lock pawl 722 in a disengaged position. Additionally, the click pawl control member 731 may, according to some example embodiments, may still be present in the click void 612, and therefore the click pawl control member 731 and the click pawl 732 may be permitted to be urged outward such that the click pawl 732 may be engaged with a click tooth 756. With the lock pawl 722 disengaged and the click pawl 732 engaged, further rotation of the external sleeve 61 in the tightening direction will permit the nut 50 to be tightened, while the click pawl 732 is permitted to ratchet and prevent rotation in the loosening direction. Additionally, when the tightening force is no longer applied, it can be seen that, due to the curved or sloped surface of the tightening lock ramp 616, the lock pawl control member 721 may be urged by the bias of the lock tang 720, back into the lock recess 615, thereby automatically reverting the chuck 10 back into the sleeve locked position.

FIG. 12B will now be described which illustrates a cross-section view of the chuck 10 taken at D-D of FIG. 3 with the chuck 10 in the tightening position. In particular, FIG. 12B illustrates the placement of the nut drive blocks 500 of the nut 50 and the sleeve drive blocks 601 of the sleeve insert 62, when the chuck 10 is in the tightening position. In this regard, according to some example embodiments, the nut drive blocks 500 and the sleeve drive blocks 601 are in contact with each other when the chuck 10 is in the tightening position.

The position of the nut 50 and the sleeve insert 62 may correspond to the positions of the click pawl control members 731 and the lock pawl control members 721 as shown in FIG. 12A. As such, the position of the lock pawl control member 721 on the tightening lock ramp 616 may allow the lock pawl 722 to be disengaged allowing for tightening of the nut 50 and may permit the sleeve insert 62 to rotate by a distance to close the gap 1101. Therefore, the sleeve tightening surface 602 of the sleeve drive block 601 may be permitted to physically engage with the nut tightening surface 502 of the nut drive block 500. Due to this physical engagement, further rotation of the external sleeve 61 may cause tightening of the nut 50.

FIG. 13A will now be described which shows a zoomed-in view of the lock pawl 722 and click pawl 732 in a cross-section view of the chuck 10 while in the sleeve unlocked position. In this regard, it can be presumed that the chuck 10 was previously in the sleeve locked position. Upon rotation of the external sleeve 61 in the loosening direction 1300 beyond a torque threshold to slide the lock pawl control member 721 out of the lock recess 615, the lock pawl control member 721 may mover over the lock surface 614 and onto the lock ramp 613. Similarly, rotation of the sleeve insert 62 may cause the click pawl control member 731 to slide onto the click ramp 611.

With the lock pawl control member 721 disposed on the lock ramp 613, the lock pawl 722 may be disengaged from the teeth 75 of the body race 71. In this regard, the height of the lock ramp 613 may be such that an inward force is applied on the lock pawl control member 721 may cause the lock pawl 722 to be disengaged. Similarly, with the click pawl control member 731 disposed on the click ramp 611, the click pawl 732 may be disengaged from the teeth 75 of the body race 71. In this regard, the height of the click ramp 611 may be such that an inward force is applied on the click pawl control member 731 may cause the click pawl 732 to be disengaged. With both the lock pawl control member 721 and the click pawl control member 731 in disengaged positions, the sleeve unlocked position can be realized, and the sleeve 60 may be free to rotate in either direction.

FIG. 12B will now be described which illustrates a cross-section view of the chuck 10 taken at D-D of FIG. 3 with the chuck 10 in the sleeve unlocked position. In particular, FIG. 13B illustrates the placement of the nut drive blocks 500 of the nut 50 and the sleeve drive blocks 601 of the sleeve insert 62, when the chuck 10 is in the sleeve unlocked position. In this regard, according to some example embodiments, the nut drive blocks 500 and the sleeve drive blocks 601 may be in contact with each other when the chuck 10 is in the sleeve unlocked position.

As mentioned above, in the sleeve unlocked position, the sleeve insert 62 may be free to rotate in either direction. However, FIG. 13B illustrates the chuck 10 in a position to perform a loosening of the nut 50. The position of the nut 50 and the sleeve insert 62 may correspond to the positions of the click pawl control members 731 and the lock pawl control members 721 as shown in FIG. 13A. As such, the position of the lock pawl control member 721 on the lock ramp 613 and the position of the click pawl control member 731 on the click ramp 611 causes both the lock pawl 722 and the click pawl 732 to be disengaged (e.g., due to flexing of the click tang 730 and the lock tang 720). As such, the sleeve insert 62 may be rotated into a position where the sleeve loosening surface 603 of the sleeve drive block 601 may be permitted to physically engage with the nut loosening surface 503 of the nut drive block 500. Also, further rotation in the loosening direction may cause the nut 50 to loosen and open the jaws 20. Alternatively, tightening of the nut 50 may alternatively be performed while in the sleeve unlocked position. However, once the tightening rotations require a threshold amount of torque, the lock pawl control member 721 may slide over the lock surface 614 and into the lock recess 615, where further force may be applied to complete a tightening with the chuck 10 in the tightening position.

In light of the above description, various example embodiment have been and will now be described. Additional example embodiments are provided with reference to further combinations of the elements, features, and concepts described herein. As such, a first embodiment may comprise a chuck. The chuck may comprise a plurality of jaws, a body, a nut, a nut race, a body race, and a sleeve. Each jaw of the plurality of jaws may include jaw threading. The plurality of jaws may be configured to move relative to the body in an opening or closing direction. The body may be configured to rotate with the drive spindle. The nut may be operably coupled with the jaw threading of the jaws such that rotation of the nut relative to the body moves the jaws relative to the body in the opening or closing direction. The nut race may be operably coupled to the nut such that the nut race rotates with the nut and may comprise a lock pawl and a click pawl. The body race may be operably coupled to the body such that the body race rotates with the body. The body race may comprise a plurality of click teeth having click stopping edges oriented in a first rotational direction and a plurality of lock teeth having lock stopping edges oriented in a second rotational direction. The sleeve may comprise a sleeve tightening surface that may be configured to engage with the nut tightening surface to tighten the nut when the sleeve is rotated into a tightening position. The sleeve may be disposed in a sleeve locked position.

The example chuck described above may be modified, augmented, or may include optional additions, some of which are described herein. The modifications, augmentations or optional additions listed below are some examples of elements that may be added in any desirable combination. Within this context, other embodiments may be defined by each respective combination of modifications, augmentations or optional additions based on the first embodiment.

For example, in a second embodiment the sleeve may be disposed in the sleeve locked position and a gap may be present between a sleeve tightening surface and a nut tightening surface. The second embodiment may be combined with the first embodiment, as appropriate.

Additionally or alternatively, in a third embodiment the sleeve may be rotated into a sleeve unlocked position and the click pawl may be disengaged from the plurality of click teeth to permit uninhibited rotation of the nut via rotation of the sleeve in the first rotational direction. The lock pawl may be disengaged from the plurality of lock teeth to permit uninhibited rotation of the nut via rotation of the sleeve in the second rotational direction. The third embodiment may be combined with any or all of first and second embodiments, as appropriate.

Additionally or alternatively, in a fourth embodiment the nut race may comprise a click tang and a lock tang. The click tang may be a flexible member that comprises the click pawl. The lock tang may be a flexible member that comprises the lock pawl. The fourth embodiment may be combined with any or all of first to third embodiments, as appropriate.

Modifying the fourth embodiment, in a fifth embodiment the click tang may comprise a click pawl control member. The lock tang may comprise a lock pawl control member. In some instances, according to the fifth embodiment, the sleeve may be rotated into the sleeve unlocked position. The click pawl member may be engaged with a click ramp of the sleeve to flex the click tang and disengage the click pawl from the plurality of click teeth. The lock pawl control member may be engaged with a lock control ramp of the sleeve to flex the lock tang and disengage the lock pawl from the plurality of lock teeth. The fifth embodiment, and the variations of the fifth embodiment, may be combined with any or all of the first to fourth embodiments, as appropriate.

Additionally or alternatively, in a sixth embodiment, the sleeve may be rotated into the tightening position. The lock pawl may be disengaged from the plurality of lock teeth. The click pawl may be engaged with one of the plurality of click teeth. The sixth embodiment may be combined with any or all of first to fifth embodiments, as appropriate.

Additionally or alternatively, in a seventh embodiment, the lock tang may comprise a lock pawl control member. In some instances, according to the seventh embodiment, the sleeve may be disposed in the sleeve locked position. The lock pawl control member may be disposed within a lock recess of the sleeve that permits the lock pawl to engage with one of the plurality of lock teeth. The seventh embodiment may be combined with any or all of the first to sixth embodiments, as appropriate.

Additionally or alternatively, in an eight embodiment, rotation of the sleeve from the sleeve locked position to the tightening position, causes the lock pawl control member to be displaced up an edge of the lock recess to disengage the lock pawl from the plurality of lock teeth by flexing the lock tang. In some instances, according to the eighth embodiment, the sleeve tightening surface may be caused to engage the nut tightening surface. The eighth embodiment may be combined with any or all of the first to seventh embodiments, as appropriate.

Additionally or alternatively, in a ninth embodiment, due to mechanical bias in the lock tang, the sleeve may be rotated into the tightening position. The pawl control member may automatically slide back into the lock recess to engage the lock pawl with one of the plurality of lock teeth and may revert back to the sleeve locked position upon release of the sleeve by a user. The ninth embodiment may be combined with any or all of the first to eighth embodiments, as appropriate.

Additionally or alternatively, in a tenth embodiment, the plurality of click teeth and the plurality of lock teeth may be disposed in a common plane through the body race. The tenth embodiment may be combined with any or all of the first to ninth embodiments, as appropriate.

Additionally or alternatively, in an eleventh embodiment, the plurality of click teeth and the plurality of lock teeth may be disposed in a common plane through the body race and the plurality of click teeth may be disposed in a continuous series. In some instances, according to the eleventh embodiment, the plurality of lock teeth may be disposed in a continuous series.

A twelfth example embodiment may comprise a chuck. The chuck may comprise a body, a plurality of jaws, a nut, a nut race, a body race, and a sleeve. The plurality of jaws may be configured to move relative to the body in an opening or closing direction. The nut may be operably coupled to the plurality of jaws such that movement of the nut relative to the body may move the jaws in the opening or closing direction. The nut may comprise a tightening nut surface. The nut race may be operably coupled to the nut such that the nut race is fixed to the nut. The nut race may comprise a lock pawl and a click pawl. The body race may be operably coupled to the body. The body race may comprise a plurality of teeth. The sleeve may comprise a sleeve tightening surface that may be configured to engage with the nut tightening surface and may tighten the nut when the sleeve is rotated into a tightening position. The sleeve may be disposed in a sleeve locked position. The click pawl may be engaged with a first tooth of the plurality of teeth and may inhibit rotation of the nut in a first rotational direction. The lock pawl may be engaged with a second tooth of the plurality of teeth and may inhibit rotation of the sleeve in the second rotational direction due to rotational inertia in the sleeve.

The example chuck of the twelfth embodiment described above may be modified, augmented, or may include optional additions, some of which are described herein. The modifications, augmentations or optional additions listed below are some examples of elements that may be added in any desirable combination. Within this context, other embodiments may be defined by each respective combination of modifications, augmentations or optional additions based on the twelfth embodiment.

For example, in a thirteenth embodiment the sleeve may be disposed in the sleeve locked position and a gap may be present between a sleeve tightening surface and the nut tightening surface and may avoid contact between the sleeve tightening surface and the nut tightening surface due to the rotational inertia in the sleeve. The thirteenth embodiment may be combined with the twelfth embodiment, as appropriate.

Additionally or alternatively, in a fourteenth embodiment, the sleeve may be rotated into a sleeve unlocked position. The click pawl may be disengaged from the plurality of teeth and may permit rotation of the nut via rotation of the sleeve in the first rotational direction. The lock pawl may be disengaged from the plurality of teeth and may permit rotation of the nut via rotation of the sleeve in the second rotational direction. The fourteenth embodiment may be combined with any or all of the twelfth to thirteenth embodiments, as appropriate.

Additionally or alternatively, in a fifteenth embodiment, the nut race may comprise a click tang and a lock tang. The click tang may be a flexible member that may comprise the click pawl. The lock tang may be a flexible member that may comprise the lock pawl. The fifteenth embodiment may be combined with any or all of the twelfth to fourteenth embodiments, as appropriate.

Additionally or alternatively, in a sixteenth embodiment, the sleeve may be rotated into the tightening position. The lock pawl may be disengaged from the plurality of teeth. The click pawl may be engaged with a third tooth of the plurality of teeth. The sixteenth embodiment may be combined with any or all of the twelfth to fifteenth embodiments, as appropriate.

Additionally or alternatively, in a seventeenth embodiment, the lock tang may comprise a lock pawl control member. In some instances, according to the seventeenth embodiment, the sleeve may be disposed in the sleeve locked position. The lock pawl control member may be disposed within a lock recess of the sleeve that may permit the lock pawl to engage with the second tooth of the plurality of teeth. The seventeenth embodiment may be combined with any or all of the twelfth to sixteenth embodiments, as appropriate.

Additionally or alternatively, in an eighteenth embodiment, the rotation of the sleeve from the sleeve locked position to the tightening position may cause the lock pawl control member to be displaced up an edge of the lock recess to disengage the lock pawl from the plurality of lock teeth by flexing the lock tang and may cause the sleeve tightening surface to engage the nut tightening surface. The eighteenth embodiment may be combined with any or all of the twelfth to seventeenth embodiments, as appropriate.

Additionally or alternatively, in a nineteenth embodiment, the plurality of teeth may be disposed in a common plane through the body race. The nineteenth embodiment may be combined with any or all of the twelfth to eighteenth embodiments, as appropriate.

Additionally or alternatively, in a twentieth embodiment, each of the plurality of teeth may be substantially symmetrical with the other teeth within the plurality of teeth. The twentieth embodiment may be combined with any or all of the twelfth to nineteenth embodiments, as appropriate.

Many modifications and other embodiments of the chuck set forth herein will come to mind to one skilled in the art to which these embodiments pertain having the benefit of the teachings presented in the foregoing descriptions and the associated drawings. Therefore, it is to be understood that the chucks are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A chuck for use with a power driver having a rotatable drive spindle, the chuck comprising:
   a plurality of jaws, each jaw including jaw threading;
   a body configured to rotate with the drive spindle, wherein the plurality of jaws are configured to rotate with the body about a center axis of the chuck, wherein the plurality of jaws are also configured to move relative to the body in an opening or closing direction;
   a nut operably coupled with the jaw threading of the jaws such that rotation of the nut relative to the body moves the jaws relative to the body in the opening or closing direction, the nut further comprising a nut tightening surface;
   a nut race operably coupled to the nut such that the nut race rotates with the nut, the nut race comprising a lock pawl and a click pawl;
   a body race operably coupled to the body such that the body race rotates with the body, the body race comprising a plurality of click teeth having click stopping edges oriented in a first rotational direction and a plurality of lock teeth having lock stopping edges oriented in a second rotational direction, the first rotational direction being opposite the second rotational direction; and
   a sleeve comprising a sleeve tightening surface that is configured to engage with the nut tightening surface to tighten the nut when the sleeve is rotated into a tightening position;
   wherein, with the sleeve disposed in a sleeve locked position, the click pawl is engaged with a click stopping edge of one of the plurality of click teeth to inhibit rotation of the nut in the first rotational direction to loosen the nut and the lock pawl is engaged with a lock stopping edge of one of the plurality of lock teeth to inhibit rotation of the sleeve in the second rotational direction due to rotational inertia in the sleeve that would tend to further tighten the nut.

2. The chuck of claim 1, wherein, with the sleeve disposed in the sleeve locked position, a gap is present between the sleeve tightening surface and the nut tightening surface.

3. The chuck of claim 1, wherein, with the sleeve rotated into a sleeve unlocked position:
   the click pawl is disengaged from the plurality of click teeth to permit uninhibited rotation of the nut via rotation of the sleeve in the first rotational direction; and
   the lock pawl is disengaged from the plurality of lock teeth to permit uninhibited rotation of the nut via rotation of the sleeve in the second rotational direction.

4. The chuck of claim 1, wherein the nut race comprises a click tang and a lock tang;
   wherein the click tang is a flexible member that comprises the click pawl;
   wherein the lock tang is a flexible member that comprises the lock pawl.

5. The chuck of claim 4, wherein the click tang further comprises a click pawl control member and the lock tang comprises a lock pawl control member; and
   wherein, with the sleeve rotated into the sleeve unlocked position:
   the click pawl control member is engaged with a click ramp of the sleeve to flex the click tang and disengage the click pawl from the plurality of click teeth; and
   the lock pawl control member is engaged with a lock control ramp of the sleeve to flex the lock tang and disengage the lock pawl from the plurality of lock teeth.

6. The chuck of claim 5, wherein the lock tang comprises a lock pawl control member; and
   wherein, with the sleeve disposed in the sleeve locked position, the lock pawl control member is disposed within a lock recess of the sleeve that permits the lock pawl to engage with one of the plurality of lock teeth.

7. The chuck of claim 6, wherein rotation of the sleeve from the sleeve locked position to the tightening position causes the lock pawl control member to be displaced up an edge of the lock recess to disengage the lock pawl from the plurality of lock teeth by flexing the lock tang and cause the sleeve tightening surface to engage the nut tightening surface.

8. The chuck of claim 7, wherein, due to mechanical bias in the lock tang when the sleeve is rotated into the tightening position, the lock pawl control member automatically slides back into the lock recess to engage the lock pawl with one of the plurality of lock teeth to revert back to the sleeve locked position upon release of the sleeve by a user.

9. The chuck of claim 1, wherein, with the sleeve rotated into the tightening position:
   the lock pawl is disengaged from the plurality of lock teeth; and
   the click pawl is engaged with one of the plurality of click teeth.

10. The chuck of claim 1, wherein the plurality of click teeth and the plurality of lock teeth are disposed in a common plane through the body race.

11. The chuck of claim 1, wherein the plurality of click teeth and the plurality of lock teeth are disposed in a common plane through the body race; and
   wherein the plurality of click teeth are disposed in a continuous series and the plurality of lock teeth are disposed in a continuous series.

12. A chuck comprising:
a body;
a plurality of jaws configured to move relative to the body in an opening or closing direction;
a nut operably coupled to the plurality of jaws such that movement of the nut relative to the body moves the jaws in the opening or closing direction, the nut further comprising a tightening nut surface;
a nut race operably coupled to the nut such that the nut race is fixed to the nut, the nut race comprising a lock pawl and a click pawl;
a body race operably coupled to the body, the body race comprising a plurality of teeth; and
a sleeve comprising a sleeve tightening surface that is configured to engage with the nut tightening surface to tighten the nut when the sleeve is rotated into a tightening position;
wherein, with the sleeve disposed in a sleeve locked position, the click pawl is engaged with a first tooth of the plurality of teeth to inhibit rotation of the nut in a first rotational direction and the lock pawl is engaged with a second tooth of the plurality of teeth to inhibit rotation of the sleeve in a second rotational direction due to rotational inertia in the sleeve.

13. The chuck of claim 12, wherein, with the sleeve disposed in the sleeve locked position, a gap is present between e the sleeve tightening surface and the nut tightening surface to avoid contact between the sleeve tightening surface and the nut tightening surface due to the rotational inertia in the sleeve.

14. The chuck of claim 12, wherein, with the sleeve rotated into a sleeve unlocked position:
the click pawl is disengaged from the plurality of teeth to permit rotation of the nut via rotation of the sleeve in the first rotational direction; and
the lock pawl is disengaged from the plurality of teeth to permit rotation of the nut via rotation of the sleeve in the second rotational direction.

15. The chuck of claim 12, wherein the nut race comprises a click tang and a lock tang;
wherein the click tang is a flexible member that comprises the click pawl;
wherein the lock tang is a flexible member that comprises the lock pawl.

16. The chuck of claim 15, wherein the lock tang comprises a lock pawl control member; and
wherein, with the sleeve disposed in the sleeve locked position, the lock pawl control member is disposed within a lock recess of the sleeve that permits the lock pawl to engage with the second tooth of the plurality of teeth.

17. The chuck of claim 16, wherein rotation of the sleeve from the sleeve locked position to the tightening position causes the lock pawl control member to be displaced up an edge of the lock recess to disengage the lock pawl from the plurality of lock teeth by flexing the lock tang and cause the sleeve tightening surface to engage the nut tightening surface.

18. The chuck of claim 12, wherein, with the sleeve rotated into the tightening position:
the lock pawl is disengaged from the plurality of teeth; and
the click pawl is engaged with a third tooth of the plurality of teeth.

19. The chuck of claim 12, wherein the plurality of teeth are disposed in a common plane through the body race.

20. The chuck of claim 12, wherein each of the plurality of teeth is substantially symmetrical with the other teeth within the plurality of teeth.

* * * * *

UNITED STATES PATENT AND TRADEMARK OFFICE
CERTIFICATE OF CORRECTION

PATENT NO. : 12,202,055 B2
APPLICATION NO. : 18/683607
DATED : January 21, 2025
INVENTOR(S) : Jichun Zhou et al.

Page 1 of 1

It is certified that error appears in the above-identified patent and that said Letters Patent is hereby corrected as shown below:

In the Claims

In Column 23, Claim 13, Line 27, "between e the sleeve" should read as -- between the sleeve --

Signed and Sealed this
Thirteenth Day of May, 2025

Coke Morgan Stewart
*Acting Director of the United States Patent and Trademark Office*